(12) United States Patent
Son et al.

(10) Patent No.: US 10,817,117 B2
(45) Date of Patent: Oct. 27, 2020

(54) INPUT-SENSING DEVICE AND DISPLAY MODULE INCLUDING THE SAME

(71) Applicant: Samsung Display Co., Ltd., Yongin-Si, Gyeonggi-Do (KR)

(72) Inventors: Hoseok Son, Seoul (KR); Kwan-ho Kim, Yongin-si (KR); Sungyeon Cho, Hwaseong-si (KR); Jaseung Ku, Seoul (KR)

(73) Assignee: Samsung Display Co., Ltd. (KR)

( * ) Notice: Subject to any disclaimer, the term of this patent is extended or adjusted under 35 U.S.C. 154(b) by 21 days.

(21) Appl. No.: 16/102,467

(22) Filed: Aug. 13, 2018

(65) Prior Publication Data

US 2019/0087033 A1 Mar. 21, 2019

(30) Foreign Application Priority Data

Sep. 18, 2017 (KR) .......................... 10-2017-0119772

(51) Int. Cl.
| | | |
|---|---|---|
| *G06F 3/044* | (2006.01) | |
| *G06F 3/047* | (2006.01) | |
| *G06F 3/0488* | (2013.01) | |
| *G06F 3/041* | (2006.01) | |

(52) U.S. Cl.
CPC ............. *G06F 3/044* (2013.01); *G06F 3/047* (2013.01); *G06F 3/0488* (2013.01); *G06F 2203/04112* (2013.01)

(58) Field of Classification Search
USPC ....................................................... 345/174
See application file for complete search history.

(56) References Cited

U.S. PATENT DOCUMENTS

| | | | |
|---|---|---|---|
| 9,116,581 B2 | 8/2015 | Peng et al. | |
| 9,383,849 B2 | 7/2016 | Hur | |
| 9,395,854 B2 | 7/2016 | Han et al. | |
| 2008/0308323 A1 | 12/2008 | Huang et al. | |
| 2011/0141039 A1* | 6/2011 | Lee .......................... | G06F 3/044 345/173 |
| 2012/0223893 A1* | 9/2012 | Yang ....................... | G06F 3/044 345/173 |
| 2013/0240342 A1 | 9/2013 | Wang | |
| 2013/0241851 A1* | 9/2013 | Wang ...................... | G06F 3/044 345/173 |
| 2013/0293589 A1* | 11/2013 | Hwang ............... | G06F 3/04845 345/666 |
| 2013/0307793 A1 | 11/2013 | Song et al. | |
| 2014/0022202 A1 | 1/2014 | Badaye et al. | |

(Continued)

FOREIGN PATENT DOCUMENTS

| | | |
|---|---|---|
| JP | 2013254360 A | 12/2013 |
| JP | 2014153789 A | 8/2014 |

(Continued)

*Primary Examiner* — Chineyere D Wills-Burns
(74) *Attorney, Agent, or Firm* — Innovation Counsel LLP

(57) ABSTRACT

An input-sensing device may include a plurality of sensors, and each of the plurality of sensors includes a plurality of protruding portions, and a plurality of signal lines that are connected to some of the plurality of sensors. The number of the protruding portions included in a sensor that is connected to one of the plurality of signal lines may be less than the number of the protruding portions included in another sensor that is connected to another one of the plurality of signal lines.

20 Claims, 14 Drawing Sheets

(56) References Cited

U.S. PATENT DOCUMENTS

| | | | |
|---|---|---|---|
| 2014/0098057 A1* | 4/2014 | Lee | G06F 3/044 345/174 |
| 2014/0347299 A1* | 11/2014 | Lu | G06F 3/044 345/173 |
| 2015/0028894 A1 | 1/2015 | Sleeman | |
| 2015/0084922 A1 | 3/2015 | Park et al. | |
| 2015/0227237 A1* | 8/2015 | Ono | G06F 3/044 345/174 |
| 2015/0286316 A1 | 10/2015 | Peterson et al. | |
| 2016/0147375 A1* | 5/2016 | Bok | G06F 3/0416 345/175 |
| 2016/0246405 A1* | 8/2016 | Hu | G06F 3/044 |
| 2016/0313858 A1* | 10/2016 | Chan | G06F 3/044 |
| 2017/0315656 A1* | 11/2017 | Guard | G06F 3/044 |
| 2018/0307355 A1 | 10/2018 | Kim et al. | |

FOREIGN PATENT DOCUMENTS

| | | |
|---|---|---|
| JP | 2017049659 A | 3/2017 |
| KR | 20120027956 A | 3/2012 |
| KR | 10-2014-0057707 A | 5/2014 |
| KR | 10-2014-0096507 A | 8/2014 |
| KR | 10-1686092 B1 | 12/2016 |
| KR | 10-2018-0119196 A | 11/2018 |

\* cited by examiner

INPUT-SENSING DEVICE AND DISPLAY MODULE INCLUDING THE SAME

CROSS-REFERENCE TO RELATED APPLICATIONS

This U.S. non-provisional patent application claims priority under 35 U.S.C. § 119 to Korean Patent Application No. 10-2017-0119772, filed on Sep. 18, 2017, in the Korean Intellectual Property Office, the entire contents of which are hereby incorporated by reference.

BACKGROUND OF THE INVENTION

The present disclosure relates to an input-sensing device that is configured to sense an external input signal, and a display module including the input-sensing device.

Various types of electronic devices such as smart phones, digital cameras, notebook computers, navigation systems, and smart televisions have been developed. A display device may be integrated in the electronic devices to provide visual information to a user.

In a recently-developed display device, an input-sensing device that is used as an input device is provided on a display panel of the display device. The input-sensing device may be classified into an add-on type, a cover glass built-in type, and a display built-in type. Furthermore, the display built-in type may be classified into an in-cell type and an on-cell type.

SUMMARY

Some embodiments of the inventive concept provide an input-sensing device that is configured to reduce a spatial variation of capacitance, and a display module including the same.

Some embodiments of the inventive concept provide an input-sensing device that is configured to suppress or prevent a ghost phenomenon (i.e., a difficulty in precisely sensing an input at a specific region), and a display module including the same.

Some embodiments of the inventive concept provide an input-sensing device that is configured to realize a display device with a thin bezel, and a display module including the same.

According to some embodiments of the inventive concept, an input-sensing device may include a plurality of receiving electrodes extending in a first direction and being arranged in a second direction crossing the first direction, each of the receiving electrodes including a first receiving sensor and a second receiving sensor, and a plurality of transmitting electrodes extending in the second direction and being arranged in the first direction, each of the transmitting electrodes including a first transmitting sensor and a second transmitting sensor.

In some embodiments, the first receiving sensor may include a first receiving frame portion and a plurality of first receiving protruding portions protruding from the first receiving frame portion. The second receiving sensor may include a second receiving frame portion and a plurality of second receiving protruding portions protruding from the second receiving frame portion, the number of the second receiving protruding portions being greater than that of the first receiving protruding portions. The first transmitting sensor may include a first transmitting frame portion and a plurality of first transmitting protruding portions protruding from the first transmitting frame portion and being provided between the first receiving protruding portions. The second transmitting sensor may include a second transmitting frame portion and a plurality of second transmitting protruding portions protruding from the second transmitting frame portion and being provided between the second receiving protruding portions.

In some embodiments, the input-sensing device may further include a plurality of receiving signal lines connected to the plurality of receiving electrodes and a plurality of transmitting signal lines connected to the plurality of transmitting electrodes. The input sensing device may include a sensing region in which the plurality of receiving electrodes and the plurality of transmitting electrodes are provided and a non-sensing region in which the plurality of receiving signal lines and the plurality of transmitting signal lines are provided.

In some embodiments, the first receiving sensor may be provided adjacent to a border of the sensing region.

In some embodiments, at least one of the plurality of receiving signal lines may be connected to the first receiving sensor.

In some embodiments, the plurality of receiving signal lines may include a plurality of first receiving signal lines connected to odd-numbered ones of the plurality of receiving electrodes that are arranged in the second direction, and provided adjacent to a first side of the sensing region, and a plurality of second receiving signal lines connected to even-numbered ones of the plurality of receiving electrodes that are arranged in the second direction, and provided adjacent to a second side of the sensing region that is opposite to the first side of the sensing region.

In some embodiments, the first receiving electrode may be connected to one of the plurality of first receiving signal lines or to one of the plurality of second receiving signal lines.

In some embodiments, at least one of the plurality of first receiving protruding portions may include a portion extending from the first receiving frame portion and having a constant width.

In some embodiments, at least one of the plurality of first receiving protruding portions may include a sub-protruding portion extending from the first receiving frame portion and having a first width and a main protruding portion extending from the sub-protruding portion and having a second width that is larger than the first width.

In some embodiments, at least one of the plurality of first receiving protruding portions may include a portion extending from the first receiving frame portion and having a shape of gradually becoming smaller in width.

In some embodiments, each of the first receiving sensor, the second receiving sensor, the first transmitting sensor, and the second transmitting sensor may have a mesh shape.

In some embodiments, the first receiving sensor and the first transmitting sensor may be provided to have a first capacitance, the second receiving sensor and the second transmitting sensor may be provided to have a second capacitance, and the input-sensing device may further include a driving circuit configured to sense a change in the first capacitance or the second capacitance.

In some embodiments, at least one of the plurality of receiving electrodes may further include a third receiving sensor. The third receiving sensor may include a third receiving frame portion, and third receiving protruding portions protruding from the third receiving frame portion, the number of the third receiving protruding portions being greater than that of the plurality of first receiving protruding portions and less than that of the plurality of second receiving protruding portions.

In some embodiments, the third receiving sensor may be provided between the first receiving sensor and the second receiving sensor.

In some embodiments, the first receiving sensor may include a capacitive coupling part capacitively coupled to the first transmitting sensor and a floating part enclosed by the capacitive coupling part and electrically disconnected from the capacitive coupling part.

According to some embodiments of the inventive concept, a display module may include a display panel with a plurality of light-emitting devices and an input-sensing device provided on the display panel.

In some embodiments, the input-sensing device may include a plurality of receiving electrodes extending in a first direction and being arranged in a second direction crossing the first direction, each of the receiving electrodes including a first receiving sensor and a second receiving sensor, and a plurality of transmitting electrodes extending in the second direction and being arranged in the first direction, each of the transmitting electrodes including a first transmitting sensor and a second transmitting sensor.

In some embodiments, the first receiving sensor may include a first receiving frame portion, and a plurality of first receiving protruding portions protruding from the first receiving frame portion. The second receiving sensor may include a second receiving frame portion, and a plurality of second receiving protruding portions protruding from the second receiving frame portion, the number of the second receiving protruding portions being greater than that of the first receiving protruding portions. The first transmitting sensor may include a first transmitting frame portion, and a plurality of first transmitting protruding portions protruding from the first transmitting frame portion and being provided between the first receiving protruding portions. The second transmitting sensor may include a second transmitting frame portion, and a plurality of second transmitting protruding portions protruding from the second transmitting frame portion and being provided between the second receiving protruding portions.

According to some embodiments of the inventive concept, an input-sensing device may include a plurality of electrodes extending in a first direction, being arranged in a second direction crossing the first direction, and including first sensors and second sensors, and a plurality of signal lines connected to the plurality of electrodes. The input sensing device includes a sensing region in which the plurality of electrodes is provided and a non-sensing region in which the plurality of signal lines is provided.

In some embodiments, each of the first sensors may include a first frame portion, and a plurality of first protruding portions protruding from the first frame portion. Each of the second sensors may include a second frame portion, and a plurality of second protruding portions protruding from the second frame portion, the number of the plurality of second protruding portions being greater than that of the plurality of first protruding portions. The plurality of signal lines may include a plurality of first signal lines connected to odd-numbered ones of the plurality of electrodes and arranged adjacent to a first side of the sensing region, and a plurality of second signal lines connected to even-numbered ones of the plurality of electrodes and arranged adjacent to a second side of the sensing region that is opposite to the first side, and each of the first sensors may be connected to a corresponding one of the plurality of signal lines.

In some embodiments, the first sensors may be provided at a border of the sensing region, and the second sensors may be provided at a center of the sensing region.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
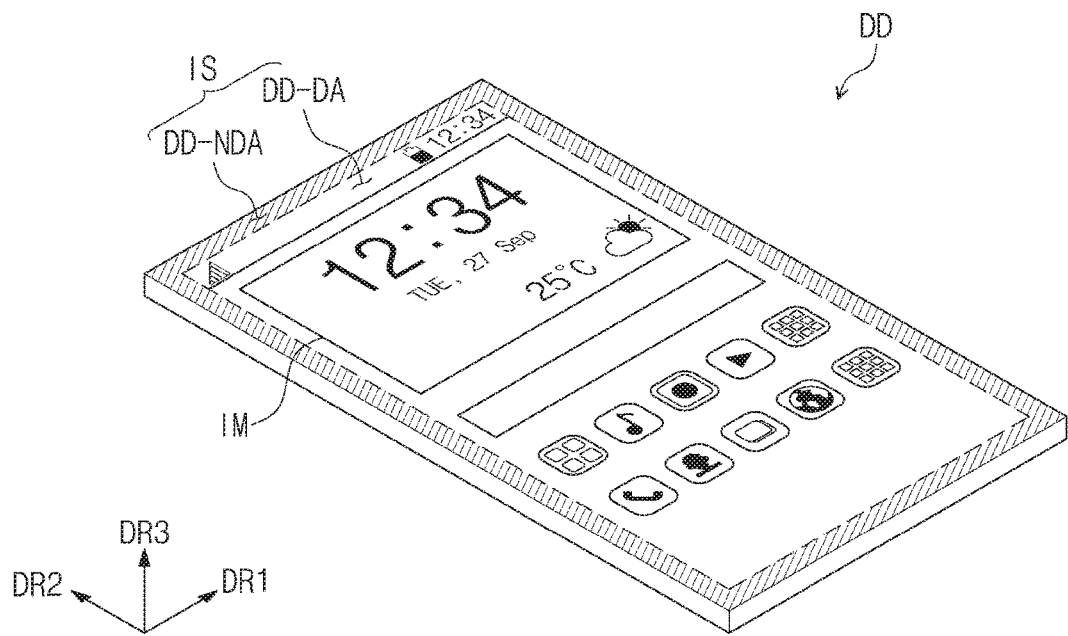
FIG. 1 is a perspective view illustrating a display device according to some embodiments of the inventive concept.

It should be noted that these figures are intended to illustrate the general characteristics of methods, structure, and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions, and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown.

Example embodiments of the inventive concepts may, however, be embodied in many different forms and should not be construed as being limited to the embodiments set forth herein; rather, these embodiments are provided so that the present disclosure will be thorough and complete, and will fully convey the concept of example embodiments to those of ordinary skill in the art. In the drawings, the thicknesses of layers and regions may be exaggerated for clarity. Like reference numerals in the drawings denote like elements, and thus their description will be omitted.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises", "comprising", "includes," and/or "including," if used herein, specify the presence of stated features, integers, steps, operations, elements, and/or components, but do not preclude the presence or addition of one or more other features, integers, steps, operations, elements, components, and/or groups thereof.

FIG. 1 is a perspective view illustrating a display device DD according to some embodiments of the inventive concept.

The display device DD may include a display surface IS that is used to display an image IM and is defined to be parallel to both of a first direction axis DR1 and a second direction axis DR2. Hereinafter, a third direction axis DR3 will be used to refer to a direction normal to the display surface IS (i.e., a thickness direction of the display device DD). A front or top surface and a rear or bottom surface of each member may be distinguished, with reference to the third direction axis DR3. However, directions indicated by the first to third direction axes DR1, DR2, and DR3 may be relative, and in certain embodiments, they may be changed to indicate other directions. Hereinafter, first to third directions may correspond to directions indicated by the first to third direction axes DR1, DR2, and DR3, respectively, and the first to third directions will be identified with the same reference numbers as the first to third direction axes DR1, DR2, and DR3.

In the present specification, the terms 'left and right' will be relatively defined with reference to the relevant figure, and may be defined differently if the reference is changed.

The display device DD may be used for large-sized electronic devices (e.g., television sets and monitors) or small- or medium-sized electronic devices (e.g., smart phones, tablets, car navigation systems, game machines, and smart watches).

Referring to FIG. 1, the display surface IS of the display device DD may include a plurality of regions. The display surface IS may include a display region DD-DA that is used to display the image IM, and a non-display region DD-NDA that is provided to be adjacent to the display region DD-DA. The non-display area DD-NDA may not be used to display an image. The non-display region DD-NDA may be used to define a bezel region of the display device DD. As shown FIG. 1, application icons may be displayed as parts of the image IM. The display region DD-DA may have a rectangular shape. The non-display region DD-NDA may be provided to surround the display region DD-DA. However, the inventive concept is not limited to this example, and in certain embodiments, shapes of the display and non-display regions DD-DA and DD-NDA may be variously changed in a complementary manner.

Figure 2:
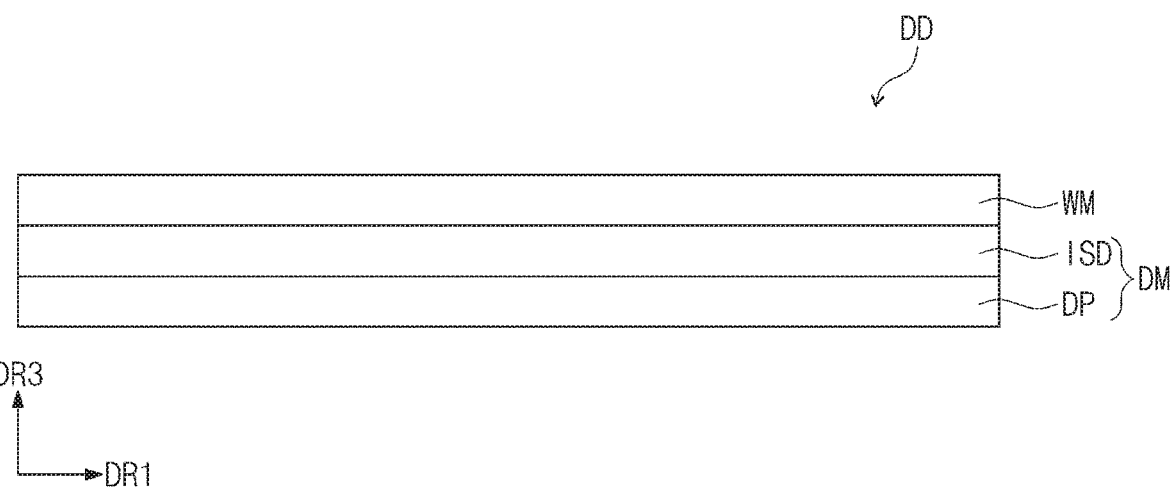
FIG. 2 is a sectional view illustrating a portion of the display device of FIG. 1.

FIG. 2 is a sectional view illustrating a portion of the display device DD of FIG. 1. The display device DD may include a window member WM and a display module DM. The display module DM may include an input-sensing device ISD and a display panel DP.

The window member WM may be configured to protect the display module DM from an external impact and to provide an input surface to a user. The window member WM may be formed of or include glass or a plastic material. The window member WM may be provided to have a transparent property and thereby to allow light that is generated by the display panel DP to pass therethrough.

Although not shown, an adhesive member may be provided between the window member WM and the display module DM.

Although not shown, the display device DD may include a protection film provided below the display module DM. The protection film may include a plastic film serving as a base layer. Materials for the protection film are not limited to plastic resins, and various organic/inorganic composites may be used for the protection film.

Figure 3:
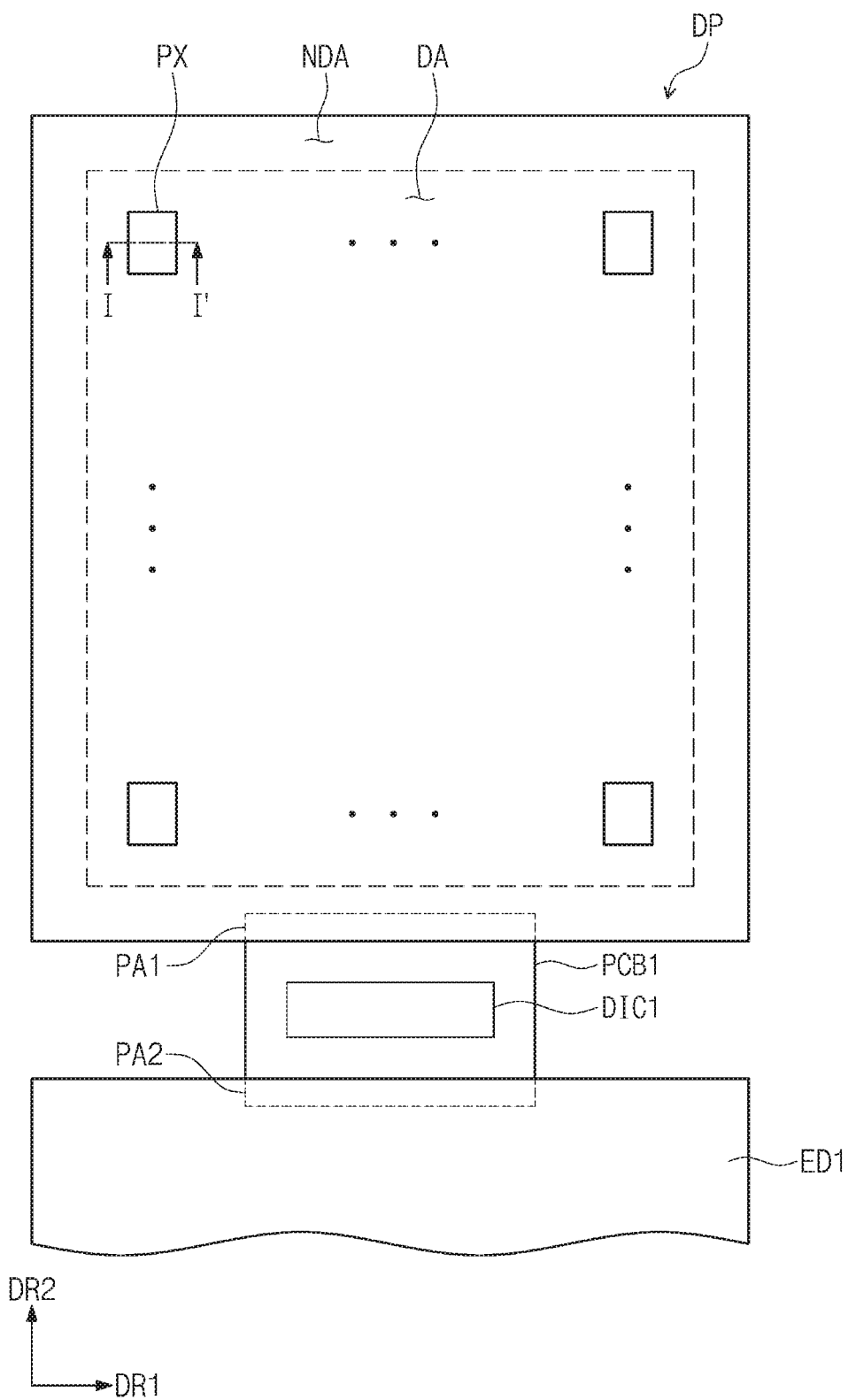
FIG. 3 is a plan view illustrating a display panel of FIG. 2.

FIG. 3 is a plan view illustrating the display panel DP of FIG. 2.

The display panel DP may include a display region DA and a non-display region NDA. The display region DA may correspond to a region, in which pixels PX are provided, and the pixels PX may be configured to provide image information to users. The non-display region NDA may correspond to a region that is located around the display region DA, and in some embodiments, interconnection lines and electronic components for driving the pixels PX may be provided in the non-display region NDA.

The non-display region NDA may include a first pad region PM. A first printed circuit board PCB1 may be coupled to the first pad region PA1.

A first electronic component ED1 may be coupled to an end of the first printed circuit board PCB1. The first electronic component ED1 may include a second pad region PA2, and the first printed circuit board PCB1 may be coupled to the first electronic component ED1 through the second pad region PA2.

A first driving circuit DIC1 may be mounted on the first printed circuit board PCB1. In some embodiments, the first driving circuit DIC1 may be mounted on the first printed circuit board PCB1 in a chip-on glass (COG) or chip-on plastic (COP) manner.

The first driving circuit DIC1 may be a source driver IC that is used to apply a data voltage to the display region DA of the display panel DP, a scan driver IC that is used to apply a gate voltage to the display region DA of the display panel DP, or a driver IC, that integrates both of the source and scan driver ICs. Although FIG. 1 illustrates an example in which the first driving circuit DIC1 is solely mounted on the first printed circuit board PCB1, the inventive concept is not limited thereto and in certain embodiments, a plurality of driver ICs may be mounted on the first printed circuit board PCB1.

A plurality of the pixels PX may be arranged in two orthogonal directions (e.g., the first and second directions DR1 and DR2) or in a matrix shape. In some embodiments, each of the pixels PX may be configured to display at least one color of red, green, and blue. In certain embodiments, each of the pixels PX may be configured to display at least one color of white, cyan, or magenta. The pixels PX may be defined as a display part of the display panel DP. Each of the pixels PX may include a light-emitting device that is used to emit light of the at least one color.

According to one embodiment, the display panel DP may be one of a liquid crystal display (LCD) panel, an organic light emitting display (OLED) panel, or an electrowetting display panel. For the sake of simplicity, the following description will refer to an example of the present embodiment in which an organic light emitting display panel is used as the display panel DP, but the inventive concept is not limited thereto.

Figure 4:
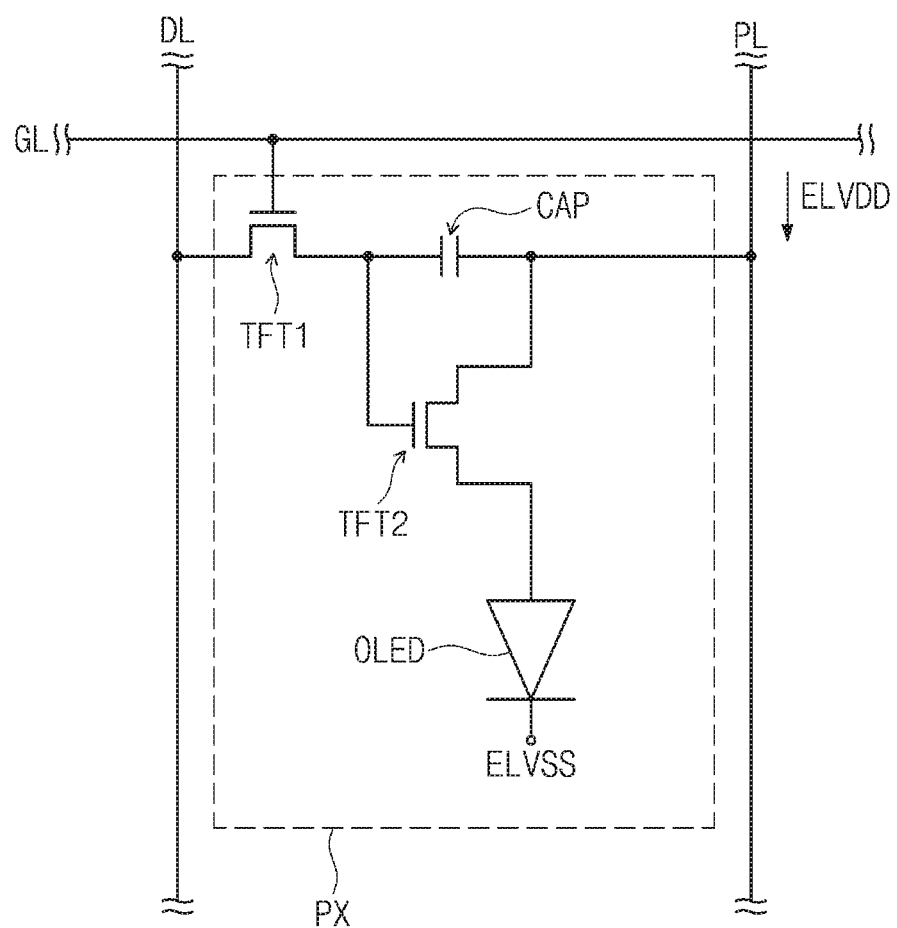
FIG. 4 is an equivalent circuit diagram of a pixel of FIG. 3.

FIG. 4 is an equivalent circuit diagram of the pixel PX of FIG. 3. FIG. 4 exemplarily illustrates one pixel PX that is connected to one of gate lines GL, one of data lines DL, and a power line PL. The structure of the pixel PX is not limited to this example and may be variously changed.

The pixel PX may include a light-emitting device OLED serving as a display element. The light-emitting device OLED may be a top-emission type diode or a bottom-emission type diode. In certain embodiments, the light-emitting device OLED may be a double-sided emission type diode. The pixel PX may include a first or switching transistor TFT1, a second or driving transistor TFT2, and a capacitor CAP that are used as a circuit for driving the light-emitting device OLED. The light-emitting device OLED may be configured to generate light, in response to electrical signals transmitted through the transistors TFT1 and TFT2.

If a scan signal is applied to the gate line GL, the first transistor TFT1 may output a data signal applied to the data line DL in response to the scan signal. The capacitor CAP may be charged to have a voltage corresponding to the data signal that is transmitted through the first transistor TFT1.

The second transistor TFT2 may be connected to the light-emitting device OLED. The second transistor TFT2 may control a driving current flowing through the light-emitting device OLED, based on an amount of charges stored in the capacitor CAP. The light-emitting device OLED may be configured to emit light, when the second transistor TFT2 is in a turn-on period.

Figure 5:
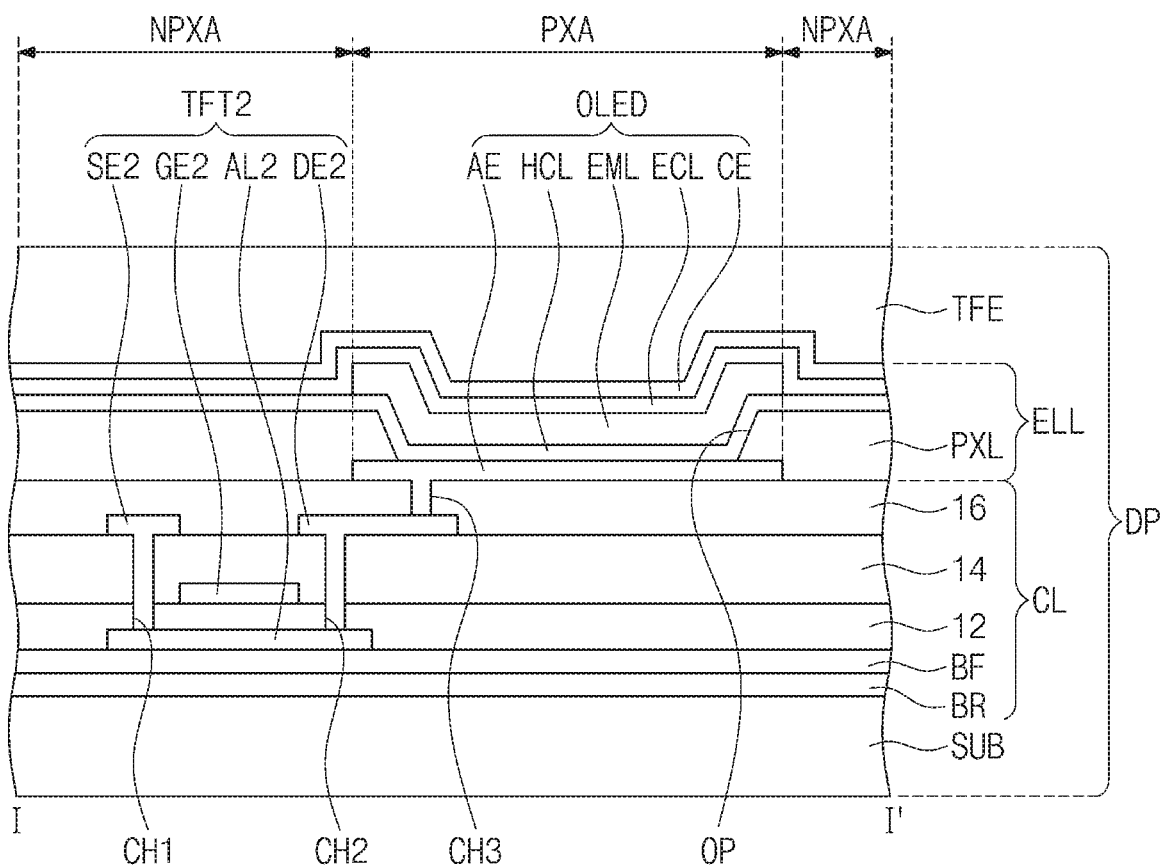
FIG. 5 is a sectional view taken along line I-I' of FIG. 3.

FIG. 5 is a sectional view taken along line of FIG. 3. FIG. 5 is a sectional view of a region, in which the second transistor TFT2 and the light-emitting device OLED shown in FIG. 4 are provided.

As shown in FIG. 5, a circuit layer CL may be provided on a base substrate layer SUB. The second transistor TFT2 may include a semiconductor pattern AL2 provided on the base substrate layer SUB. The semiconductor pattern AL2 may be formed of or include at least one of amorphous silicon, poly silicon, or metal oxide semiconductor materials.

The circuit layer CL may include organic/inorganic layers BR, BF, 12, 14, and 16, the first transistor TFT1 (e.g., see FIG. 4), and the second transistor TFT2. The organic/inorganic layers BR, BF, 12, 14, and 16 may include functional layers BR and BF, a first insulating layer 12, a second insulating layer 14, and a third insulating layer 16.

The functional layers BR and BF may be provided on a surface of the base substrate layer SUB. The functional layers BR and BF may include at least one of a barrier layer BR or a buffer layer BF. The semiconductor pattern AL2 may be provided on the barrier layer BR or the buffer layer BF.

The first insulating layer 12 may be provided on the base substrate layer SUB to cover the semiconductor pattern AL2. The first insulating layer 12 may include an organic layer and/or an inorganic layer. In certain embodiments, the first insulating layer 12 may include a plurality of inorganic thin-films. The plurality of inorganic thin-films may include a silicon nitride layer and a silicon oxide layer.

A control electrode GE2 of the second transistor TFT2 may be provided on the first insulating layer 12. Although not shown, a control electrode of the first transistor TFT1 (e.g., see FIG. 4) may also be provided on the first insulating layer 12. The control electrode GE2 and the gate line GL (e.g., see FIG. 4) may be formed using the same photolithography process. In other words, the control electrode GE2 may be formed of the same material as the gate lines GL, and the control electrode GE2 and the gate lines GL may have the same stacking structure and may be provided at the same level.

The second insulating layer 14 may be provided on the first insulating layer 12 to cover the control electrode GE2. The second insulating layer 14 may include an organic layer and/or an inorganic layer. In certain embodiments, the second insulating layer 14 may include a plurality of inorganic thin-films. The plurality of inorganic thin-films may include a silicon nitride layer and a silicon oxide layer.

The data line DL (e.g., see FIG. 4) may be provided on the second insulating layer 14. An input electrode (or a source electrode) SE2 and an output electrode (or a drain electrode) DE2 of the second transistor TFT2 may be provided on the second insulating layer 14. Although not shown, the first transistor TFT1 (e.g., see FIG. 4) may also include an input electrode and an output electrode that are provided on the second insulating layer 14. The input electrode SE2 may correspond to a portion that is branched off from a corresponding one of the data lines DL. The power line PL (e.g., see FIG. 4) and the data lines DL may correspond to different portions of the same layer. The input electrode SE2 may correspond to a portion that is branched off from the power line PL.

A portion of an electrode of the capacitor CAP may be provided on the second insulating layer 14. The portion of the electrode of the capacitor CAP may be formed using the same photolithography process as that used to form the data lines DL and the power line PL. In this case, the portion of the electrode of the capacitor CAP, the data lines DL, and the power line PL may be formed of the same material and at the same level and may have the same stacking structure.

The input electrode SE2 and the output electrode DE2 may be connected to respective portions of the semiconductor pattern AL2 through a first through hole CH1 and a second through hole CH2 that are formed to penetrate both of the first insulating layer 12 and the second insulating layer 14. In certain embodiments, the first transistor TFT1 and the second transistor TFT2 may be configured to have a bottom gate structure.

The third insulating layer 16 may be provided on the second insulating layer 14 to cover the input electrode SE2 and the output electrode DE2. The third insulating layer 16 may include an organic layer and/or an inorganic layer. In certain embodiments, the third insulating layer 16 may include an organic material and may be formed to have a planar top surface.

According to a circuit structure of the pixel PX, it may be possible to omit one of the first insulating layer 12, the second insulating layer 14, and the third insulating layer 16. Each of the second insulating layer 14 and the third insulating layer 16 may be defined as an interlayered insulating layer. The interlayered insulating layer may be provided between vertically-separated conductive patterns and may be used to electrically disconnect the vertically-separated conductive patterns from each other.

A light-emitting device layer ELL may be provided on the third insulating layer 16. The light-emitting device layer ELL may include a pixel definition layer PXL and the light-emitting device OLED. The light-emitting device OLED includes an anode AE, a hole control layer HCL, a light emitting layer EML, an electron control layer ECL, and a cathode CE. The anode AE may be provided on the third insulating layer 16. The anode AE may be connected to the output electrode DE2 of the second transistor TFT2 through a third through hole CH3 that is formed to penetrate the third insulating layer 16. An opening OP may be defined in the pixel definition layer PXL to expose a portion of the anode AE.

The light-emitting device layer ELL may include a light-emitting region PXA and a non-light-emitting region NPXA adjacent to the light-emitting region PXA. The non-light-emitting region NPXA may be provided to enclose the light-emitting region PXA. In the present embodiment, the light-emitting region PXA may be defined to correspond to the anode AE. However, the structure or position of the light-emitting region PXA is not limited thereto, and for example, the light-emitting region PXA may be defined as a region, from which light is emitted. In certain embodiments, the light-emitting region PXA may be defined to correspond to the portion of the anode AE exposed by the opening OP.

The hole control layer HCL may be provided in common in the light-emitting region PXA and the non-light-emitting region NPXA. Although not shown, a common layer, such as the hole control layer HCL, may be provided in common in a plurality of the pixels PX (e.g., see FIG. 4).

The light emitting layer EML may be provided on the hole control layer HCL. The light emitting layer EML may be locally provided in a region corresponding to the opening OP. In other words, the light emitting layer EML may be divided into a plurality of patterns that are formed in the plurality of pixels PX, respectively.

The light emitting layer EML may include an organic material or an inorganic material.

The electron control layer ECL may be provided on the light emitting layer EML. The cathode CE may be provided on the electron control layer ECL. The cathode CE may be placed in common in the plurality of the pixels PX.

In the present embodiment, the light emitting layer EML is illustrated to have a patterned structure, but in certain embodiments, the light emitting layer EML may be provided in common to span the plurality of pixels PX. In this case, the light emitting layer EML may be configured to emit a white-color light. In certain embodiments, the light emitting layer EML may be provided to have a multi-layered structure.

In the present embodiment, a thin encapsulation layer TFE may be provided to directly cover the cathode CE. In certain embodiments, a capping layer may be further provided to cover the cathode CE. In this case, the thin encapsulation layer TFE may be provided to directly cover the capping layer. The thin encapsulation layer TFE may include at least one of organic and inorganic layers.

Figure 6:
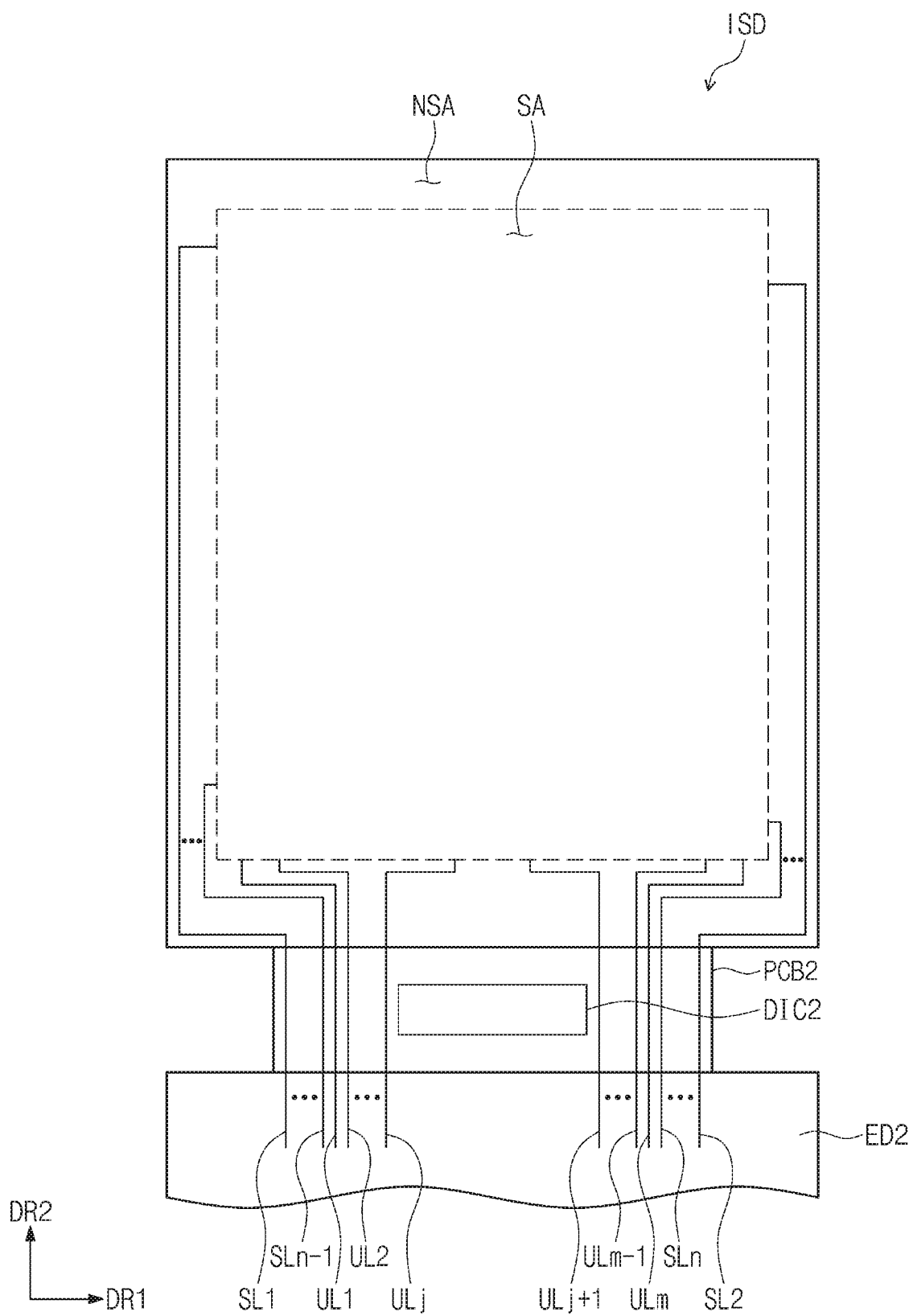
FIG. 6 is a plan view illustrating an input-sensing device of FIG. 2.
Figure 7:
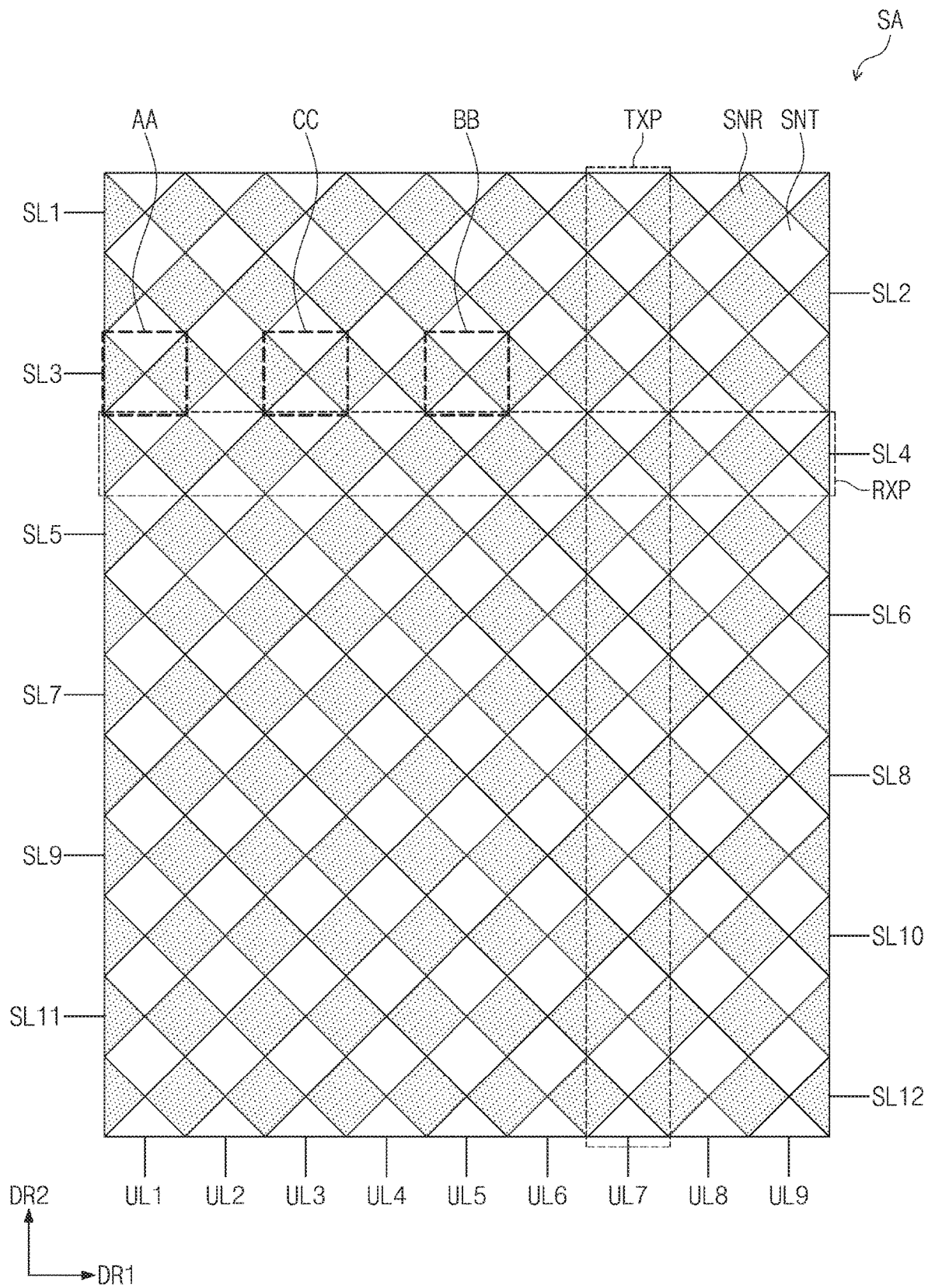
FIG. 7 is a plan view illustrating a sensing region SA of FIG. 6.

FIG. 6 is a plan view illustrating the input-sensing device ISD of FIG. 2. FIG. 7 is a plan view illustrating a sensing region SA of FIG. 6.

The input-sensing device ISD may include a sensing region SA and a non-sensing region NSA. In other words, the sensing region SA and a non-sensing region NSA are defined in the input-sensing device ISD. The sensing region SA may overlap the display region DA, and the non-sensing region NSA may overlap the non-display region NDA.

The sensing region SA may correspond to a region, in which a plurality of transmitting electrodes TXP and a plurality of receiving electrodes RXP are provided, and may be configured to sense an external input that is input through a finger of a user or a touch pen. The non-sensing region NSA may correspond to a region located around the sensing region SA, and interconnection lines and electronic components that are used to sense an input from the transmitting electrodes TXP and the receiving electrodes RXP may be provided in the non-sensing region NSA.

Each of the transmitting electrodes TXP and the receiving electrodes RXP may include a plurality of sensors. For example, each of the transmitting electrodes TXP may include a plurality of transmitting sensors SNT, and each of the receiving electrodes RXP may include a plurality of receiving sensors SNR.

The receiving electrodes RXP may extend in the first direction DR1 and may be arranged in the second direction DR2. The transmitting electrodes TXP may extend in the second direction DR2 and may be arranged in the first direction DR1.

Each of the receiving and transmitting sensors SNR and SNT may have a mesh shape. The receiving sensors SNR and the transmitting sensors SNT may be capacitively coupled to each other. The receiving and transmitting sensors SNR and SNT may be directly provided on the thin encapsulation layer TFE of the display panel DP (e.g., see FIG. 5). Here, the expression "the sensors SNR and SNT may be directly provided on the thin encapsulation layer TFE" means that a process of forming the sensors SNR and SNT may be directly performed on the thin encapsulation layer TFE. However, the inventive concept is not limited thereto. For example, the sensors SNR and SNT may be provided on a base film, and the base film provided with the sensors SNR and SNT may be attached to the display panel DP by an adhesive member.

Each of the receiving sensors SNR may be configured to serve as a receiver, and each of the transmitting sensors SNT may be configured to serve as a transmitter. However, the functions of the receiving and transmitting sensors SNR and SNT are not limited thereto, and shapes or functions of the receiving and transmitting sensors SNR and SNT may be variously changed.

The non-sensing region NSA may include a plurality of signal lines SL1 to SLn and UL1 to ULm. In the present specification, the signal line may also be referred to as an interconnection line.

The signal lines SL1 to SLn and UL1 to Ulm may include receiving signal lines SL1 to SLn and transmitting signal lines UL1 to ULm. The receiving signal lines SL1 to SLn may be extended from the receiving electrodes RXP, and the transmitting signal lines UL1 to Ulm may be extended from the transmitting electrodes TXP.

However, the inventive concept is not limited thereto, and in certain embodiments, shapes or functions of the receiving and transmitting signal lines SL1 to SLn and UL1 to Ulm may be variously changed.

The odd-numbered ones of the receiving signal lines SL1 to SLn may be arranged at a left side of the sensing region SA, and the even-numbered ones of the receiving signal lines SL1 to SLn may be arranged at a right side of the sensing region SA. However, the inventive concept is not limited thereto, and in certain embodiments, the odd-numbered ones of the receiving signal lines SL1 to SLn may be arranged at the right side of the sensing region SA, and the even-numbered ones of the receiving signal lines SL1 to SLn may be arranged at the left side of the sensing region SA.

In other words, the even- and odd-numbered ones of the receiving signal lines SL1 to SLn may be alternately provided at both sides of the sensing region SA.

Since the receiving signal lines SL1 to SLn are distributedly arranged at both sides of the sensing region SA, it may be possible to reduce a width of the non-sensing region NSA.

Referring to FIG. 6, a second printed circuit board PCB2 may be coupled to the non-sensing region NSA. A second driving circuit DIC2 may be mounted on the second printed circuit board PCB2. The second printed circuit board PCB2 may be coupled to a second electronic component ED2.

The second driving circuit DIC2 may be configured to transmit electrical signals for sensing a change in capacitance between the receiving and transmitting sensors SNR and SNT.

FIG. 7 illustrates an example, in which twelve receiving signal lines SL1 to SL12 and nine transmitting signal lines UL1 to UL9 are provided. In other words, FIG. 7 illustrates an example in which the numbers n and m in FIG. 6 are 12 and 9, respectively.

Each of the odd-numbered ones (e.g., SL1, SL3, SL5, SL7, SL9, and SL11) of the receiving signal lines SL1 to SL12 may be extended leftward from a corresponding one of the receiving electrodes RXP. Each of the even-numbered ones (e.g., SL2, SL4, SL6, SL8, SL10, and SL12) of the receiving signal lines SL1 to SL12 may be extended rightward from a corresponding one of the receiving electrodes RXP.

Unit sensing regions, in which the receiving sensors SNR connected to the receiving signal lines SL1 to SL12 are provided, may have greater capacitance than other unit sensing regions that are located adjacent thereto in the second direction DR2. Here, the unit sensing region may be defined as a region corresponding to a portion that is depicted by 'AA', 'BB', or 'CC' in FIG. 7.

The region 'AA' that is a unit sensing region including the receiving sensor SNR connected to the third receiving signal line SL3 may have a greater capacitance than other unit sensing regions located above or below the unit sensing region 'AA'. This may cause a vertical variation of capacitance, and may lead to an error (e.g., ghost phenomenon) in accurately sensing an external input. This error may be prevented by providing the receiving and transmitting sensors SNR and SNT that have shapes and arrangement to be described below.

Figure 8:
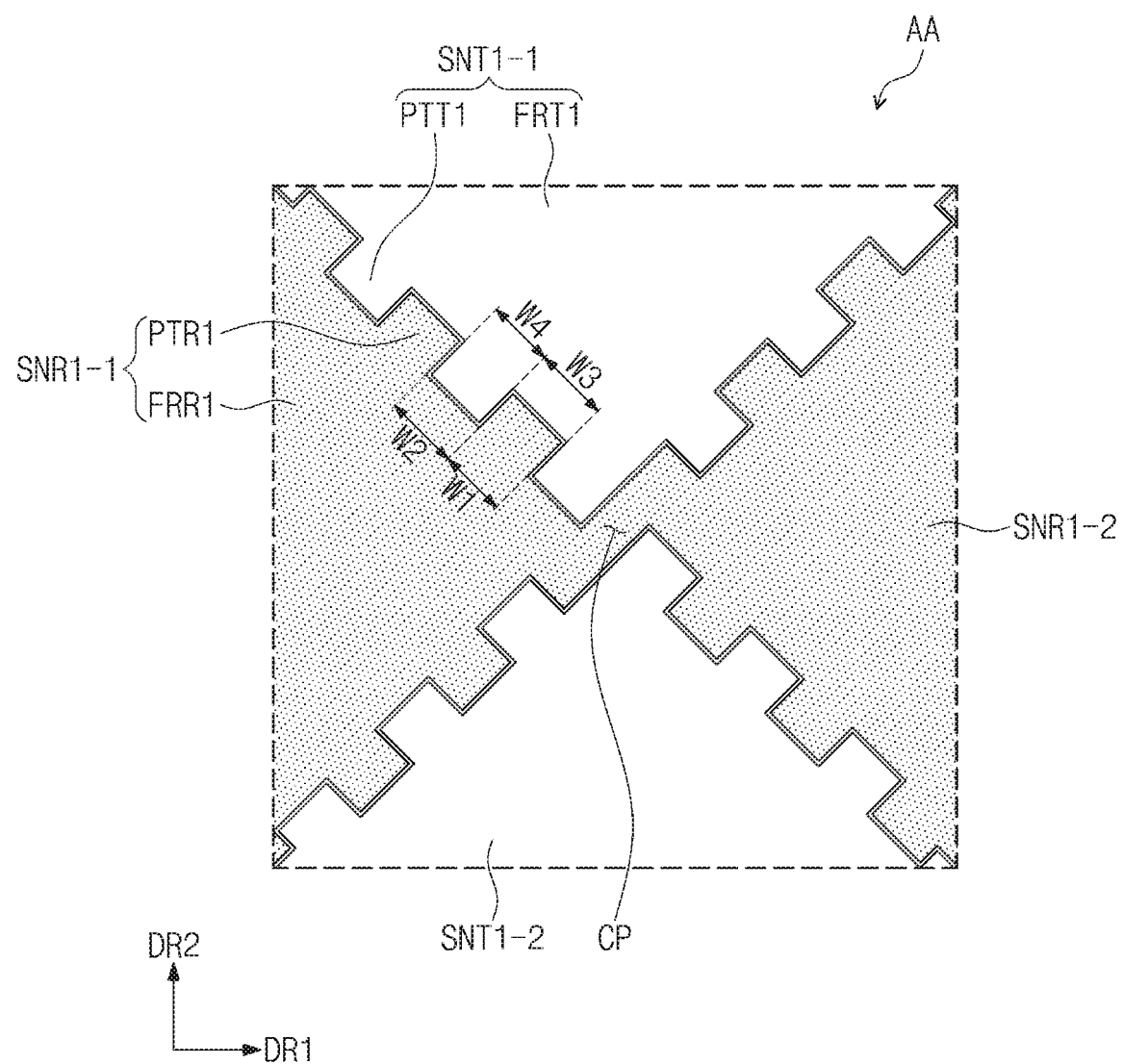
FIG. 8 is an enlarged plan view illustrating a region 'AA' of FIG. 7.
Figure 9:
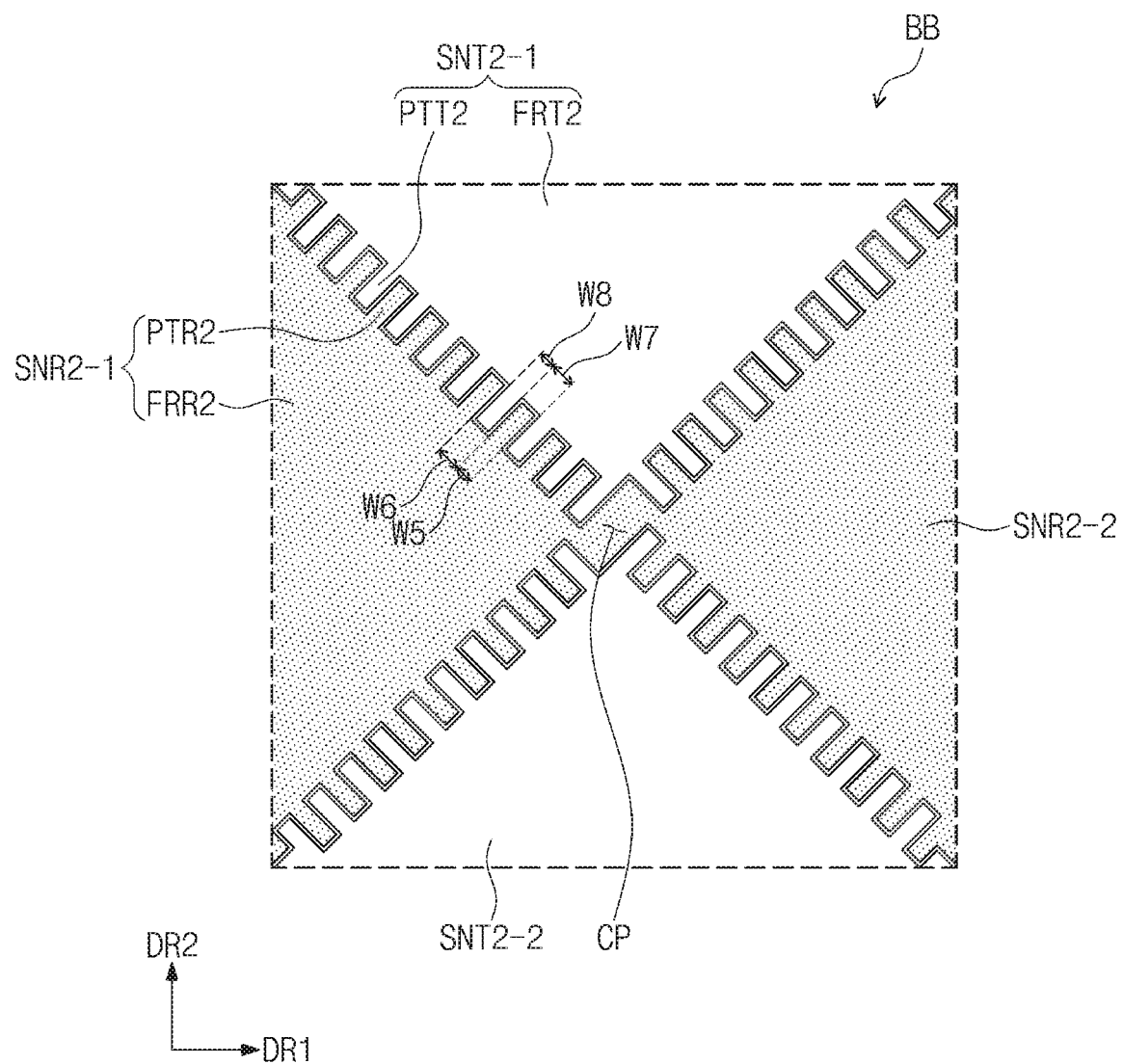
FIG. 9 is an enlarged plan view illustrating a region 'BB' of FIG. 7.
Figure 10:
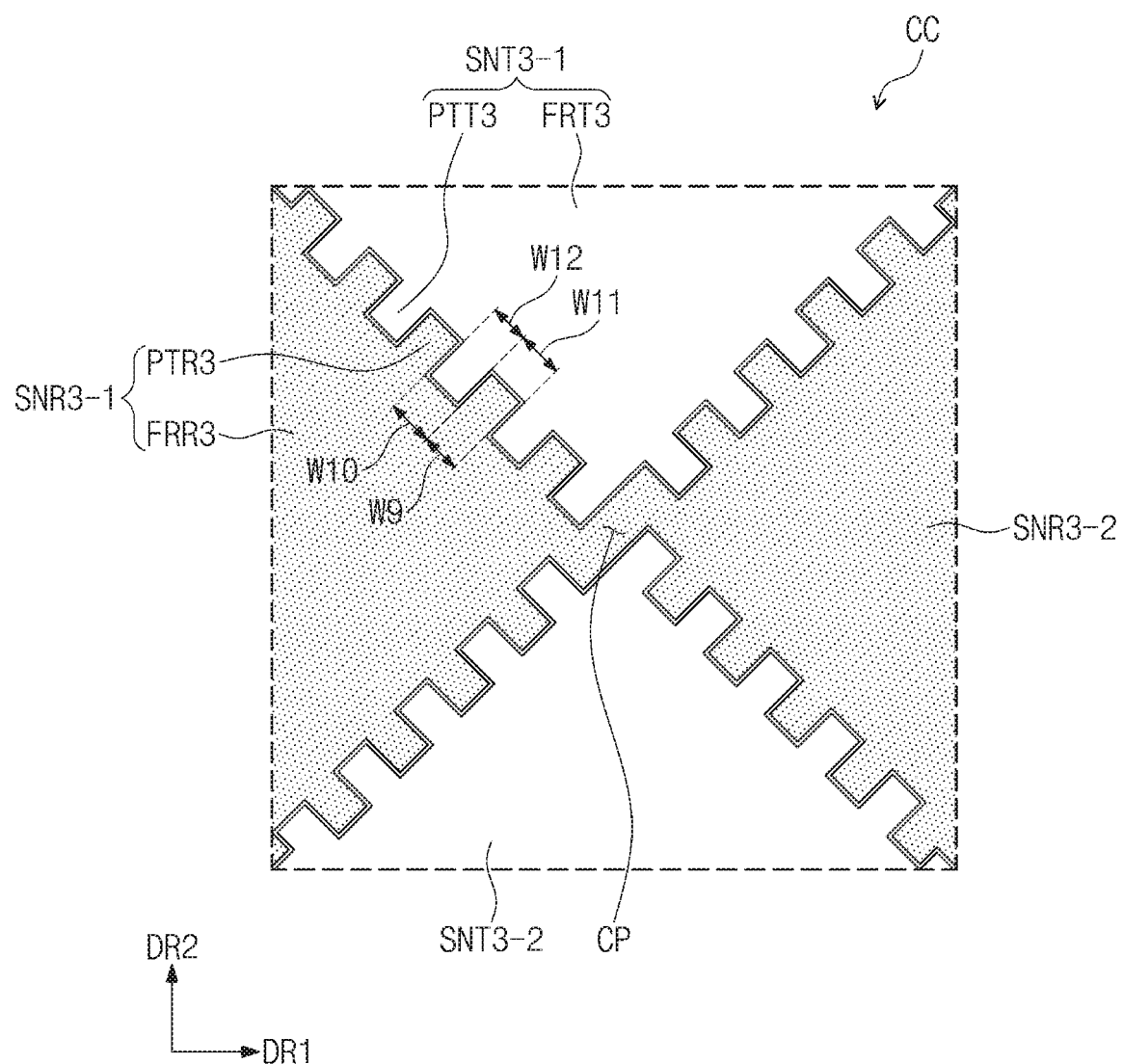
FIG. 10 is an enlarged plan view illustrating a region 'CC' of FIG. 7.

FIG. 8 is an enlarged plan view illustrating the region 'AA' of FIG. 7. FIG. 9 is an enlarged plan view illustrating the region 'BB' of FIG. 7. FIG. 10 is an enlarged plan view illustrating the region 'CC' of FIG. 7.

Referring to FIG. 8, the region 'AA' may include a left first receiving sensor SNR1-1, a right first receiving sensor SNR1-2, an upper first transmitting sensor SNT1-1, and a lower first transmitting sensor SNT1-2.

The left first receiving sensor SNR1-1 may include a first receiving frame portion FRR1 and a plurality of first receiving protruding portions PTR1. The first receiving protruding portions PTR1 may protrude from the first receiving frame portion FRR1.

For example, the first receiving frame portion FRR1 may have a diamond shape with four edges (or a half of the diamond shape with two edges depending on the location of the region 'AA', for example, a border of the sensing region), and the first receiving protruding portions PTR1 may be extended from the edges of the first receiving frame portion FRR1.

The first receiving protruding portions PTR1 may be spaced apart from each other by a second width W2, and each of them may have a first width W1.

In some embodiments, each of the first receiving protruding portions PTR1 may be extended from the first receiving frame portion FRR1 with a constant width (e.g., the first width W1). In other words, each of the first receiving protruding portions PTR1 may have a rectangular or diamond shape. For example, the first receiving protruding portions PTR1 may be provided to form a zigzag outline.

The right first receiving sensor SNR1-2 may be connected to the left first receiving sensor SNR1-1 by a connecting portion CP. The right first receiving sensor SNR1-2 may be provided to have substantially the same structure or shape as that of the left first receiving sensor SNR1-1 described above, and thus, duplicate description thereof will be omitted, for the sake of brevity.

The upper first transmitting sensor SNT1-1 may include a first transmitting frame portion FRT1 and a plurality of first transmitting protruding portions PTT1. The first transmitting protruding portions PTT1 may protrude from the first transmitting frame portion FRT1.

For example, the first transmitting frame portion FRT1 may have a diamond shape with four edges (only a half of the diamond shape with two edges are shown), and the first transmitting protruding portions PTT1 may be extended from the edges of the first transmitting frame portion FRT1.

The first transmitting protruding portions PTT1 may be spaced apart from each other by a third width W3, and each of them may have a fourth width W4.

The first transmitting protruding portions PTT1 may be provided between the first receiving protruding portions PTR1. To realize this shape or configuration, the first width W1 may be less than the third width W3, and the second width W2 may be larger than the fourth width W4.

In some embodiments, each of the first transmitting protruding portions PTT1 may be extended from the first transmitting frame portion FRT1 with a constant width (e.g., the fourth width W4). In other words, each of the first transmitting protruding portions PTT1 may have a rectangular or diamond shape. The first transmitting protruding portions PTT1 may be provided to form a zigzag outline.

The lower first transmitting sensor SNT1-2 may be connected to the upper first transmitting sensor SNT1-1 by a connecting portion (not shown) that is provided in the form of a bridge. The lower first transmitting sensor SNT1-2 may be provided to have substantially the same structure or shape as that of the upper first transmitting sensor SNT1-1 described above, and thus, duplicate description thereof will be omitted, for the sake of brevity.

Referring to FIG. 9, the region 'BB' may include a left second receiving sensor SNR2-1, a right second receiving sensor SNR2-2, an upper second transmitting sensor SNT2-1, and a lower second transmitting sensor SNT2-2.

The left second receiving sensor SNR2-1 may include a second receiving frame portion FRR2 and a plurality of second receiving protruding portions PTR2. The second receiving protruding portions PTR2 may protrude from the second receiving frame portion FRR2.

For example, the second receiving frame portion FRR2 may have a diamond shape with four edges (only a half of the diamond shape with two edges are shown), and the second receiving protruding portions PTR2 may be extended from the edges of the second receiving frame portion FRR2.

The second receiving protruding portions PTR2 may be spaced apart from each other by a sixth width W6, and each of them may have a fifth width W5.

The fifth width W5 may be less than the first width W1, and the sixth width W6 may be less than the second width W2. Accordingly, the number of the second receiving protruding portions PTR2 protruding from the second receiving frame portion FRR2 may be greater than the number of the first receiving protruding portions PTR1 protruding from the first receiving frame portion FRR1.

Electrostatic capacitance between the receiving and transmitting sensors SNR and SNT may be determined by a length of a border line between adjacent sensors. The longer the length of the border line, the more portions contributing to the capacitance between the receiving and transmitting sensors SNR and SNT.

Since the number of the first receiving protruding portions PTR1 of the region 'AA' is less than the number of the second receiving protruding portions PTR2 of the region 'BB', a length of a border line between the sensors SNR1-1, SNR1-2, SNT1-1, and SNT1-2 of the region 'AA' may be shorter than a length of a border line between the sensors SNR2-1, SNR2-2, SNT2-1, and SNT2-2 of the region 'BB'. Thus, the capacitance between the sensors SNR1-1, SNR1-2, SNT1-1, and SNT1-2 in the region 'AA' may be smaller than that between the sensors SNR2-1, SNR2-2, SNT2-1, and SNT2-2 in the region 'BB'.

A technical problem in the conventional art (e.g., a spatial variation of capacitance in the sensing region SA that may be caused by a portion corresponding to the region 'AA') has been described with reference to FIG. 7. According to some embodiments of the inventive concept, such a spatial variation of capacitance in the sensing region SA may be prevented by forming the portion corresponding to the region 'AA' of FIG. 7 in the form of that shown in FIG. 8 and by forming the portion corresponding to the region 'BB' of FIG. 7 in the form shown in FIG. 9.

In some embodiments, each of the second receiving protruding portions PTR2 may be extended from the second receiving frame portion FRR2 with a constant width (e.g., the fifth width W5). In other words, each of the second receiving protruding portions PTR2 may have a rectangular or diamond shape.

The right second receiving sensor SNR2-2 may be connected to the left second receiving sensor SNR2-1 by the connecting portion CP. The right second receiving sensor SNR2-2 may be provided to have substantially the same structure or shape as that of the left second receiving sensor SNR2-1 described above, and thus, duplicate description thereof will be omitted, for the sake of brevity.

The upper second transmitting sensor SNT2-1 may include a second transmitting frame portion FRT2 and a plurality of second transmitting protruding portions PTT2. The second transmitting protruding portions PTT2 may protrude from the second transmitting frame portion FRT2.

For example, the second transmitting frame portion FRT2 may have a diamond shape with four edges (only a half of the diamond shape with two edges are shown), and the second transmitting protruding portions PTT2 may be extended from the edges of the second transmitting frame portion FRT2.

The second transmitting protruding portions PTT2 may be spaced apart from each other by a seventh width W7, and each of them may have an eighth width W8.

The second transmitting protruding portions PTT2 may be provided between the second receiving protruding portions PTR2. To realize this shape or configuration, the fifth width W5 may be less than the seventh width W7, and the sixth width W6 may be larger than the eighth width W8.

In some embodiments, each of the second transmitting protruding portions PTT2 may be extended from the second transmitting frame portion FRT2 with a constant width (e.g., the eighth width W8). In other words, each of the second transmitting protruding portions PTT2 may have a rectangular or diamond shape.

The lower second transmitting sensor SNT2-2 may be connected to the upper second transmitting sensor SNT2-1 by a connecting portion (not shown) that is provided in the form of a bridge. The lower second transmitting sensor SNT2-2 may be configured to have substantially the same structure or shape as that of the upper second transmitting sensor SNT2-1, and thus, duplicate description thereof will be omitted, for the sake of brevity.

Referring to FIG. 10, the region 'CC' may include a left third receiving sensor SNR3-1, a right third receiving sensor SNR3-2, an upper third transmitting sensor SNT3-1, and a lower third transmitting sensor SNT3-2.

The left third receiving sensor SNR3-1 may include a third receiving frame portion FRR3 and a plurality of third receiving protruding portions PTR3. The third receiving protruding portions PTR3 may protrude from the third receiving frame portion FRR3.

For example, the third receiving frame portion FRR3 may have a diamond shape with four edges (only a half of the diamond shape with two edges are shown), and the third receiving protruding portions PTR3 may be extended from the edges of the third receiving frame portion FRR3.

The third receiving protruding portions PTR3 may be spaced apart from each other by a tenth width W10, and each of them may have a ninth width W9.

The ninth width W9 may be less than the first width W1 and larger than the fifth width W5, and the tenth width W10 may be less than the second width W2 and larger than the sixth width W6. Thus, the number of the third receiving protruding portions PTR3 protruding from the third receiving frame portion FRR3 may be greater than the number of the first receiving protruding portions PTR1 protruding from the first receiving frame portion FRR1 and may be smaller than the number of the second receiving protruding portions PTR2 protruding from the second receiving frame portion FRR2.

The capacitances between the sensors SNR3-1, SNR3-2, SNT3-1, and SNT3-2 in the region 'CC' may have intermediate values between the capacitances in the region 'AA' (e.g., between the sensors SNR1-1, SNR1-2, SNT1-1, and SNT1-2) and the capacitances in the region 'BB' (e.g., between the sensors SNR2-1, SNR2-2, SNT2-1, and SNT2-2).

Accordingly, the capacitances between the sensors SNR and SNT in the first direction DR1 may be linearly controlled.

In some embodiments, each of the third receiving protruding portions PTR3 may be extended from the third receiving frame portion FRR3 with a constant width (e.g., the ninth width W9). In other words, each of the third receiving protruding portions PTR3 may have a rectangular or diamond shape.

The right third receiving sensor SNR3-2 may be connected to the left third receiving sensor SNR3-1 by the connecting portion CP. The right third receiving sensor SNR3-2 may be provided to have substantially the same structure or shape as that of the left third receiving sensor SNR3-1 described above, and thus, duplicate description thereof will be omitted, for the sake of brevity.

The upper third transmitting sensor SNT3-1 may include a third transmitting frame portion FRT3 and a plurality of third transmitting protruding portions PTT3. The third transmitting protruding portions PTT3 may protrude from the third transmitting frame portion FRT3.

For example, the third transmitting frame portion FRT3 may have a diamond shape with four edges (only a half of the diamond shape with two edges are shown), and the third transmitting protruding portions PTT3 may be extended from the edges of the third transmitting frame portion FRT3.

The third transmitting protruding portions PTT3 may be spaced apart from each other by an eleventh width W11, and each of them may have a twelfth width W12.

The third transmitting protruding portions PTT3 may be provided between the third receiving protruding portions PTR3. To realize this shape or configuration, the ninth width W9 may be less than the eleventh width W11, and the tenth width W10 may be larger than the twelfth width W12.

In some embodiments, each of the third transmitting protruding portions PTT3 may be extended from the third transmitting frame portion FRT3 with a constant width (e.g., the twelfth width W12). In other words, each of the third transmitting protruding portions PTT3 may have a rectangular or diamond shape.

The lower third transmitting sensor SNT3-2 may be connected to the upper third transmitting sensor SNT3-1 by a connecting portion (not shown) that is provided in the form of a bridge. The lower third transmitting sensor SNT3-2 may be provided to have substantially the same structure or shape as that of the upper third transmitting sensor SNT3-1 described above, and thus, duplicate description thereof will be omitted, for the sake of brevity.

FIGS. 11, 12, 13, and 14 are plan views, each of which illustrates a unit sensing region AA-1, AA-2, or AA-3 corresponding to the region 'AA' of FIG. 7.

Figure 11:
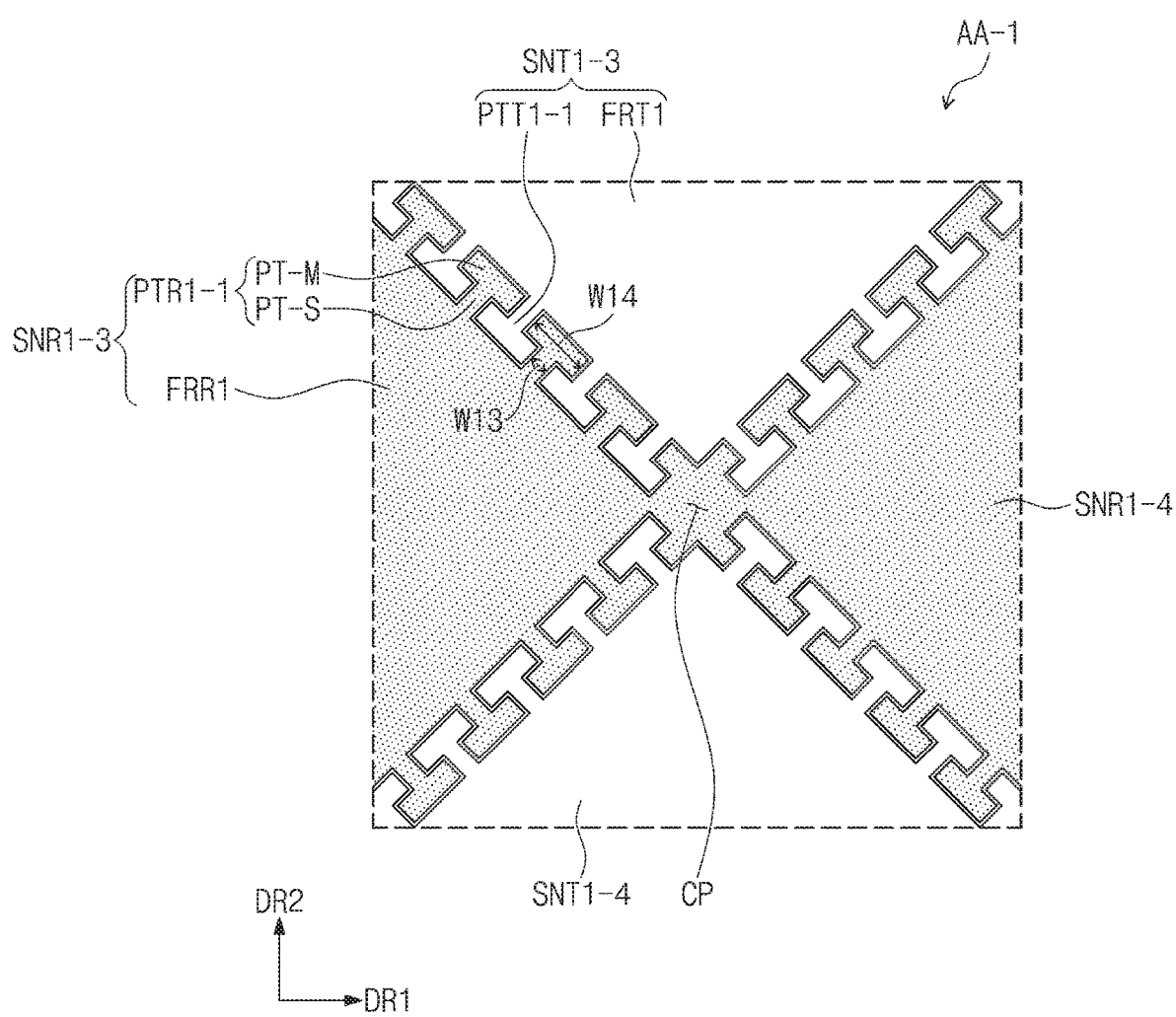
FIGS. 11, 12, 13, and 14 are plan views, each illustrating a region corresponding to the region 'AA' of FIG. 7.

Referring to FIG. 11, the unit sensing region AA-1 may include a left first receiving sensor SNR1-3, a right first receiving sensor SNR1-4, an upper first transmitting sensor SNT1-3, and a lower first transmitting sensor SNT1-4.

The left first receiving sensor SNR1-3 may include the first receiving frame portion FRR1 and a plurality of first receiving protruding portions PTR1-1. The first receiving protruding portions PTR1-1 may protrude from the first receiving frame portion FRR1.

For example, the first receiving frame portion FRR1 may have a diamond shape with four edges (or a half of the diamond shape with two edges depending on the location of the region 'AA-1', for example, a border of the sensing region), and the first receiving protruding portions PTR1-1 may be extended from the edges of the first receiving frame portion FRR1.

At least one of the first receiving protruding portions PTR1-1 may include a sub-protruding portion PT-S and a main protruding portion PT-M. The sub-protruding portion PT-S may be extended from the first receiving frame portion FRR1, while maintaining a thirteenth width W13. The main protruding portion PT-M may be extended from the sub-protruding portion PT-S, while maintaining a fourteenth width W14 that is larger than the thirteenth width W13.

The right first receiving sensor SNR1-4 may be connected to the left first receiving sensor SNR1-3 by a connecting portion CP. The right first receiving sensor SNR1-4 may be provided to have substantially the same structure or shape as that of the left first receiving sensor SNR1-3 described above, and thus, duplicate description thereof will be omitted, for the sake of brevity.

The upper first transmitting sensor SNT1-3 may include the first transmitting frame portion FRT1 and a plurality of first transmitting protruding portions PTT1-1. The first transmitting protruding portions PTT1-1 may protrude from the first transmitting frame portion FRT1.

For example, the first transmitting frame portion FRT1 may have a diamond shape with four edges (only a half of the diamond shape with two edges are shown), and the first transmitting protruding portions PTT1-1 may be extended from the edges of the first transmitting frame portion FRT1.

The first transmitting protruding portions PTT1-1 may be provided to have substantially the same structure or shape as that of the first receiving protruding portions PTR1-1 described above, and thus, duplicate description thereof will be omitted, for the sake of brevity.

The lower first transmitting sensor SNT1-4 may be connected to the upper first transmitting sensor SNT1-3 by a connecting portion (not shown) that is provided in the form of a bridge. The lower first transmitting sensor SNT1-4 may be provided to have substantially the same structure or shape as that of the upper first transmitting sensor SNT1-3 described above, and thus, duplicate description thereof will be omitted, for the sake of brevity.

Figure 12:
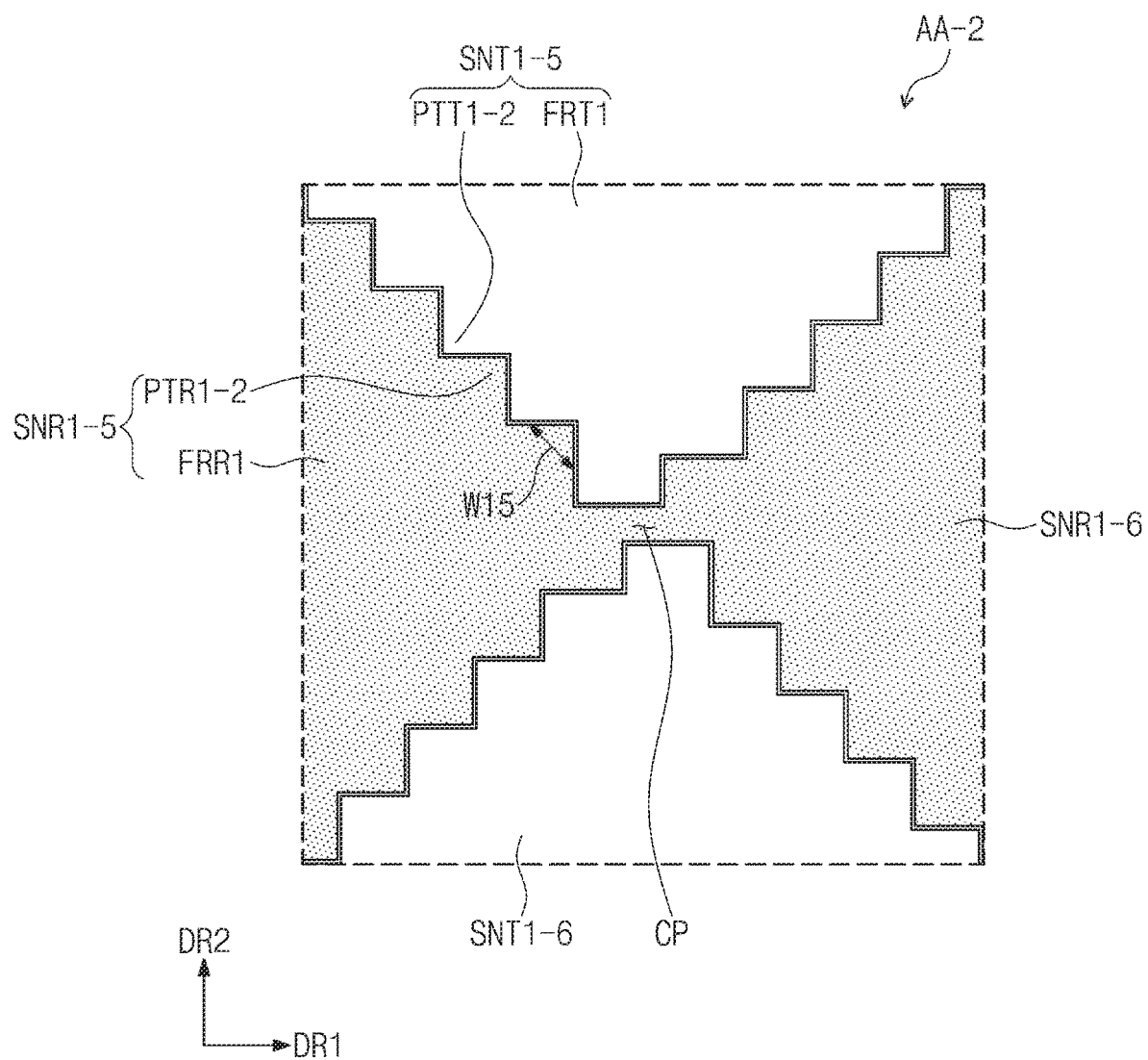

Referring to FIG. 12, the unit sensing region AA-2 may include a left first receiving sensor SNR1-5, a right first receiving sensor SNR1-6, an upper first transmitting sensor SNT1-5, and a lower first transmitting sensor SNT1-6.

The unit sensing region AA-2 may include protruding portions PTR1-2 and PTT1-2 that have shapes different from those of the protruding portions PTR1, PTT1, PTR1-1, and PTT1-1 shown in FIGS. 8 and 11.

The first receiving protruding portions PTR1-2 may be extended from the first receiving frame portion FRR1, and at least one of the first receiving protruding portions PTR1-2 may have a fifteenth width W15 decreasing in an extension direction thereof or may have a tapered shape. In other words, each of the first receiving protruding portions PTR1-2 may have a triangular shape.

The first transmitting protruding portions PTT1-2 may have a shape corresponding to that of the first receiving protruding portions PTR1-2.

Except for the above features, the unit sensing region AA-2 may be configured to be substantially the same as those described above, and thus, a detailed description thereof will be omitted.

Figure 13:
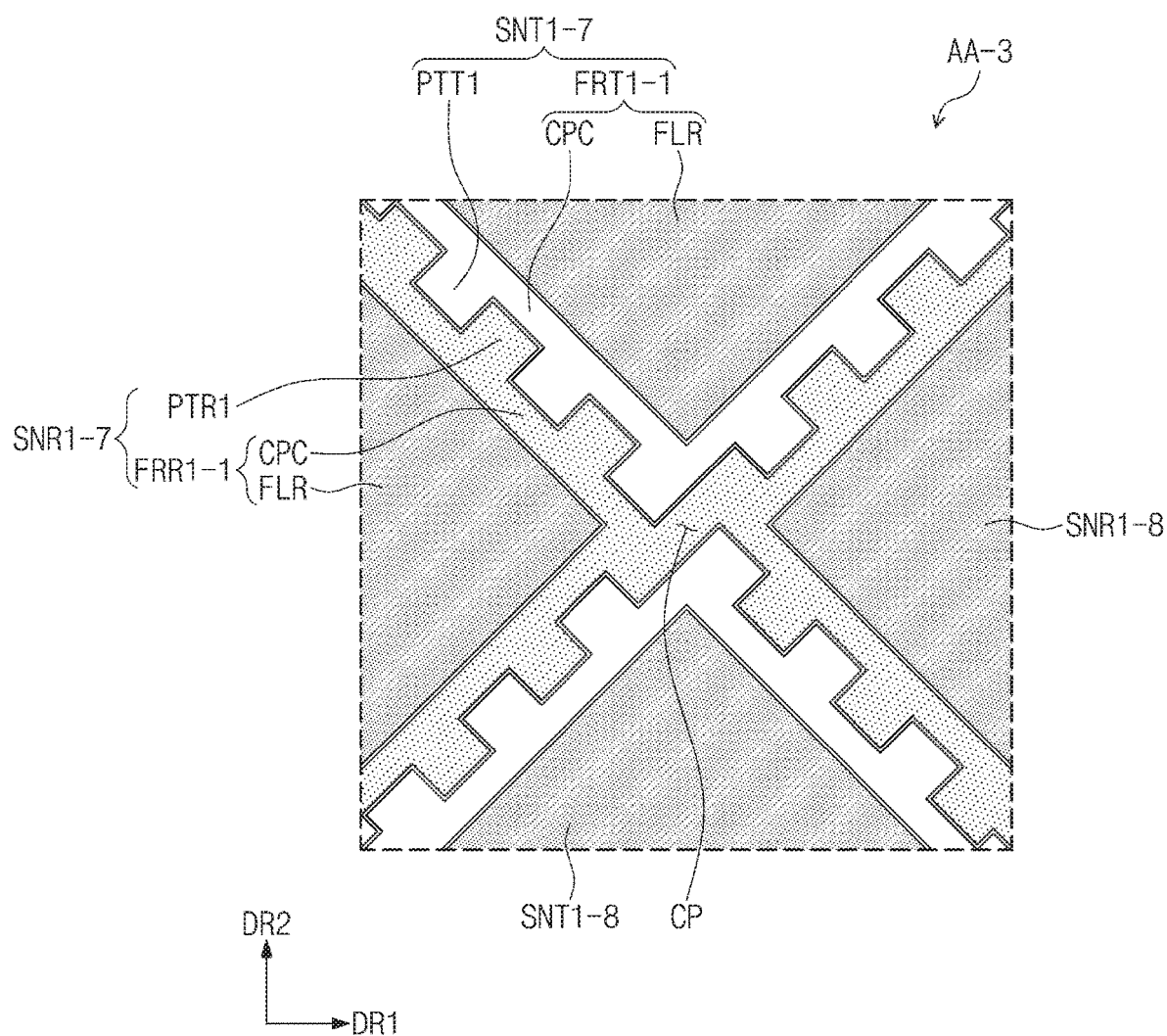

Referring to FIG. 13, the unit sensing region AA-3 may include a left first receiving sensor SNR1-7, a right first receiving sensor SNR1-8, an upper first transmitting sensor SNT1-7, and a lower first transmitting sensor SNT1-8.

The left first receiving sensor SNR1-7 may include a first receiving frame portion FRR1-1 and the plurality of the first receiving protruding portions PTR1. The first receiving protruding portions PTR1 may be configured to have substantially the same features as that of FIG. 8, and thus, duplicate description thereof will be omitted, for the sake of brevity.

The first receiving frame portion FRR1-1 may include a capacitive coupling part CPC and a floating part FLR. The capacitive coupling part CPC may be capacitively coupled to the upper first transmitting sensor SNT1-7, the lower first transmitting sensor SNT1-8, or both. The floating part FLR may be enclosed by the capacitive coupling part CPC. The floating part FLR may be electrically disconnected from the capacitive coupling part CPC.

The right first receiving sensor SNR1-8 may be connected to the left first receiving sensor SNR1-7 via a connecting portion CP. The right first receiving sensor SNR1-8 may be provided to have substantially the same structure or shape as that of the left first receiving sensor SNR1-7 described above, and thus, duplicate description thereof will be omitted, for the sake of brevity.

The upper first transmitting sensor SNT1-7 may include a first transmitting frame portion FRT1-1 and a plurality of the first transmitting protruding portions PTT1. The first transmitting protruding portions PTT1 may be configured to have substantially the same features as that of FIG. 8, and thus, duplicate description thereof will be omitted, for the sake of brevity.

The first transmitting frame portion FRT1-1 may include another capacitive coupling part CPC and another floating part FLR. The capacitive coupling part CPC of the first transmitting frame portion FRT1-1 may be capacitively coupled to the left first receiving sensor SNR1-7, the right first receiving sensor SNR1-8, or both. The floating part FLR may be enclosed by the capacitive coupling part CPC. The floating part FLR may be electrically disconnected from the capacitive coupling part CPC.

The lower first transmitting sensor SNT1-8 may be connected to the upper first transmitting sensor SNT1-7 by a connecting portion (not shown) that is provided in the form of a bridge. The lower first transmitting sensor SNT1-8 may be provided to have substantially the same structure or shape as that of the upper first transmitting sensor SNT1-7 described above, and thus, duplicate description thereof will be omitted, for the sake of brevity.

Figure 14:
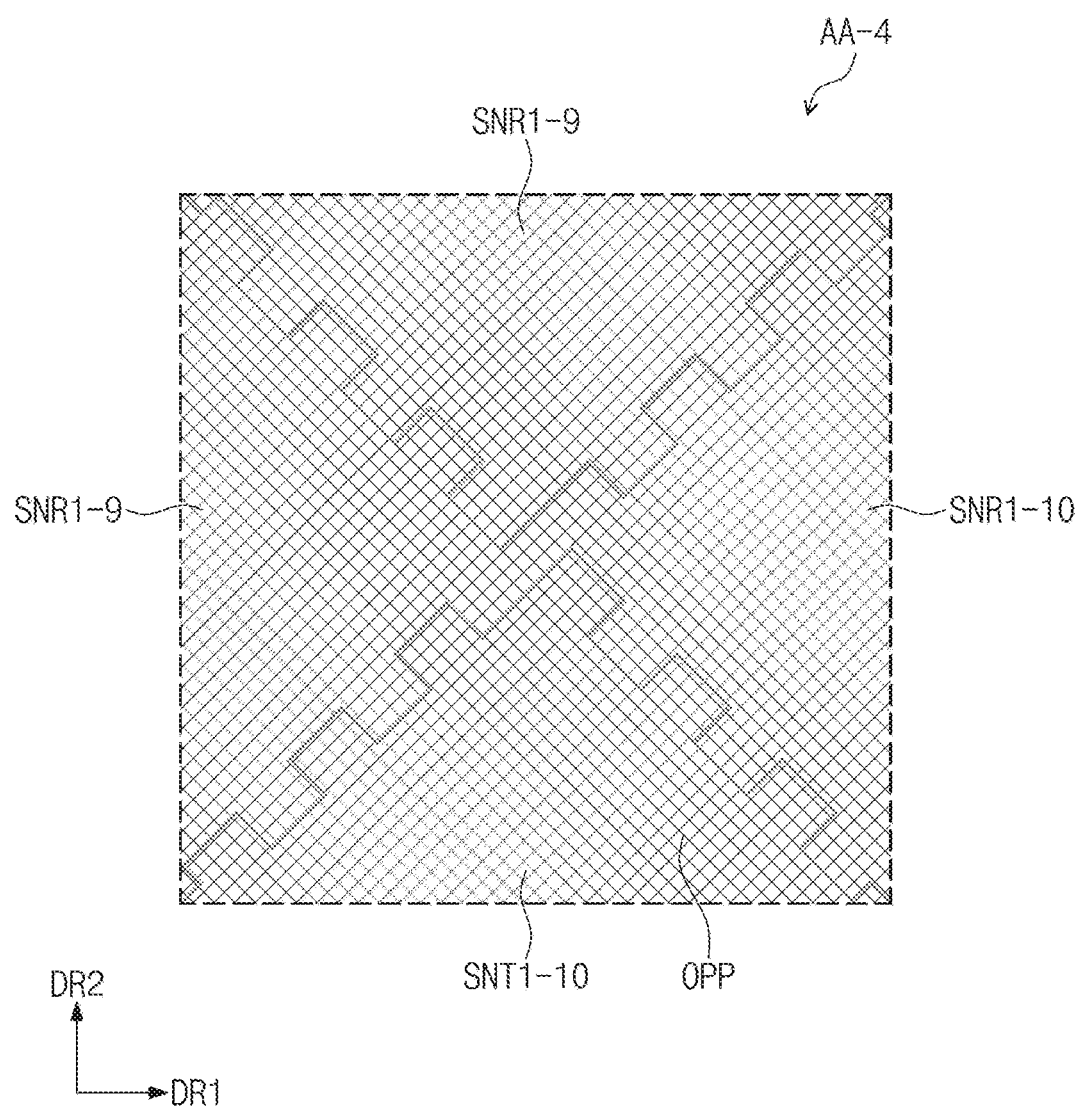

Referring to FIG. 14, the unit sensing region AA-4 may include a left first receiving sensor SNR1-9, a right first receiving sensor SNR1-10, an upper first transmitting sensor SNT1-9, and a lower first transmitting sensor SNT1-10.

The sensors SNR1-9, SNR1-10, SNT1-9, and SNT1-10 of the unit sensing region AA-4 may be provided to have a mesh shape defining openings OPP. The light-emitting devices OLED (e.g., see FIG. 4) of the display panel DP (e.g., see FIG. 3) may be exposed through the openings OPP.

Figure 15:
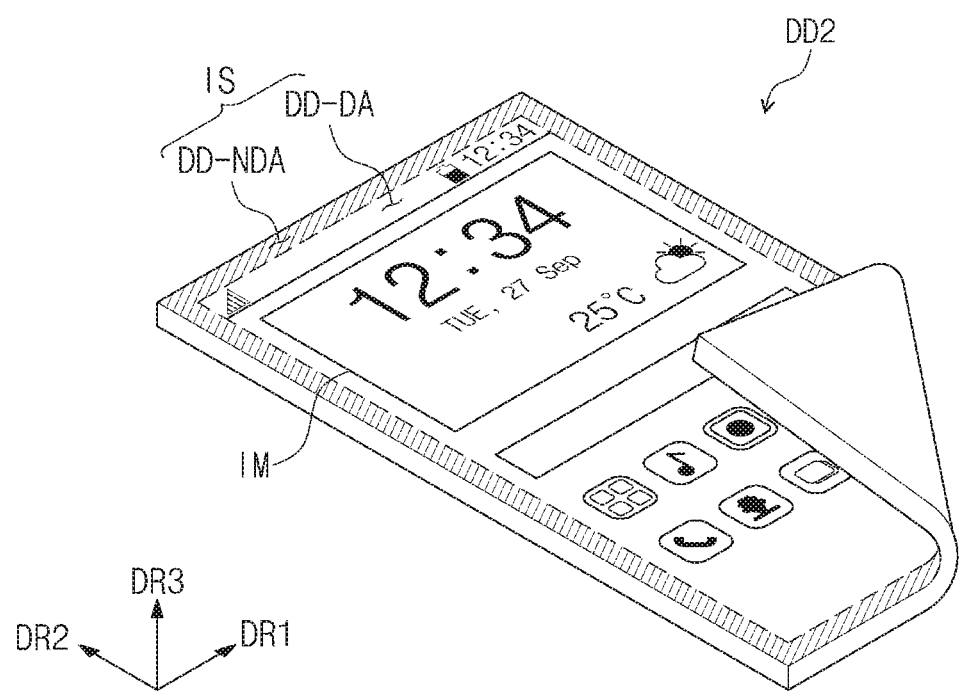
FIG. 15 is a perspective view illustrating a display device according to some embodiments of the inventive concept.

FIG. 15 is a perspective view illustrating a display device DD2 according to some embodiments of the inventive concept. The display device DD2 may have the substantially same or similar features of the display device DD described above. At least a portion, or the entirety, of the display device DD2 may be configured be bent or rolled.

According to some embodiments of the inventive concept, a display module may include an input-sensing device that is configured to realize improved uniformity in capacitance between adjacent sensors.

By virtue of the improved uniformity in capacitance, it may be possible to provide an input-sensing device, in which a ghost phenomenon is suppressed, and a display module including the same.

In addition, signal lines connected to sensors may be dividedly arranged at left and right sides of a sensing region, and in this case, an input-sensing device of a display module may be configured to allow for a display device with a thin bezel.

While example embodiments of the inventive concepts have been particularly shown and described, it will be understood by one of ordinary skill in the art that variations in form and detail may be made therein without departing from the spirit and scope of the attached claims.

What is claimed is:

1. An input-sensing device, comprising:
   a plurality of receiving electrodes extending in a first direction and being arranged in a second direction crossing the first direction, each of the plurality of receiving electrodes comprising a first receiving sensor and a second receiving sensor; and
   a plurality of transmitting electrodes extending in the second direction and being arranged in the first direction, each of the transmitting electrodes comprising a first transmitting sensor and a second transmitting sensor,
   wherein the first receiving sensor comprises:
   a first receiving frame portion; and
   a plurality of first receiving protruding portions protruding from the first receiving frame portion,
   wherein the second receiving sensor comprises:
   a second receiving frame portion; and
   a plurality of second receiving protruding portions protruding from the second receiving frame portion, the number of the second receiving protruding portions being greater than that of the first receiving protruding portions,
   wherein the first transmitting sensor comprises:
   a first transmitting frame portion; and
   a plurality of first transmitting protruding portions protruding from the first transmitting frame portion, and being provided between the first receiving protruding portions,
   wherein the second transmitting sensor comprises:
   a second transmitting frame portion; and
   a plurality of second transmitting protruding portions protruding from the second transmitting frame portion, and being provided between the second receiving protruding portions,
   wherein a length of a first border line between the first receiving sensor and the first transmitting sensor shorter than a length of a second border line between the second receiving sensor and the second transmitting sensor,
   wherein the first border line is defined by the plurality of first receiving protruding portions and the plurality of first transmitting protruding portions, which engage with each other, and
   wherein the second border line is defined by the plurality of second receiving protruding portions and the plurality of second transmitting protruding portions, which engage with each other.

2. The input-sensing device of claim 1, further comprising a plurality of receiving signal lines connected to the plurality of receiving electrodes and a plurality of transmitting signal lines connected to the plurality of transmitting electrodes,
   wherein the input-sensing device includes a sensing region in which the plurality of receiving electrodes and the plurality of transmitting electrodes are provided and a non-sensing region in which the plurality of receiving signal lines and the plurality of transmitting signal lines are provided.

3. The input-sensing device of claim 2, wherein the first receiving sensor is provided adjacent to a border between the sensing region and the non-sensing region.

4. The input-sensing device of claim 3, wherein at least one of the plurality of receiving signal lines is connected to the first receiving sensor.

5. The input-sensing device of claim 3, wherein the plurality of receiving signal lines comprise:
   a plurality of first receiving signal lines connected to odd-numbered ones of the plurality of receiving electrodes that are arranged in the second direction, and provided adjacent to a first side of the sensing region; and
   a plurality of second receiving signal lines connected to even-numbered ones of the plurality of receiving electrodes that are arranged in the second direction, and provided adjacent to a second side of the sensing region that is opposite to the first side of the sensing region.

6. The input-sensing device of claim 5, wherein each of the plurality of receiving electrodes is connected to one of the plurality of first receiving signal lines or to one of the plurality of second receiving signal lines.

7. The input-sensing device of claim 1, wherein at least one of the plurality of first receiving protruding portions comprises a portion extending from the first receiving frame portion and having a constant width.

8. The input-sensing device of claim 1, wherein at least one of the plurality of first receiving protruding portions comprises:
   a sub-protruding portion extending from the first receiving frame portion and having a first width; and
   a main protruding portion extending from the sub-protruding portion and having a second width that is larger than the first width.

9. The input-sensing device of claim 1, wherein at least one of the plurality of first receiving protruding portions comprises a portion extending from the first receiving frame portion and having a shape of gradually becoming smaller in width.

10. The input-sensing device of claim 1, wherein each of the first receiving sensor, the second receiving sensor, the first transmitting sensor, and the second transmitting sensor has a mesh shape.

11. The input-sensing device of claim 1, wherein the first receiving sensor and the first transmitting sensor are provided to have a first capacitance,
the second receiving sensor and the second transmitting sensor are provided to have a second capacitance, and
the input-sensing device further comprises a driving circuit configured to sense a change in the first capacitance or the second capacitance.

12. The input-sensing device of claim 1, wherein at least one of the plurality of receiving electrodes further comprises a third receiving sensor, and
the third receiving sensor comprises:
a third receiving frame portion; and
a plurality of third receiving protruding portions protruding from the third receiving frame portion, the number of the plurality of third receiving protruding portions being greater than that of the plurality of first receiving protruding portions and less than that of the plurality of second receiving protruding portions.

13. The input-sensing device of claim 12, wherein the third receiving sensor is provided between the first receiving sensor and the second receiving sensor.

14. The input-sensing device of claim 1, wherein the first receiving sensor comprises:
a capacitive coupling part capacitively coupled to the first transmitting sensor; and
a floating part enclosed by the capacitive coupling part and electrically disconnected from the capacitive coupling part.

15. A display module, comprising:
a display panel with a plurality of light-emitting devices; and
an input-sensing device provided on the display panel, wherein the input-sensing device comprises:
a plurality of receiving electrodes extending in a first direction and being arranged in a second direction crossing the first direction, each of the plurality of receiving electrodes comprising a first receiving sensor and a second receiving sensor; and
a plurality of transmitting electrodes extending in the second direction and being arranged in the first direction, each of the transmitting electrodes comprising a first transmitting sensor and a second transmitting sensor,
wherein the first receiving sensor comprises:
a first receiving frame portion; and
a plurality of first receiving protruding portions protruding from the first receiving frame portion,
wherein the second receiving sensor comprises:
a second receiving frame portion; and
a plurality of second receiving protruding portions protruding from the second receiving frame portion, the number of the second receiving protruding portions being greater than that of the first receiving protruding portions,
wherein the first transmitting sensor comprises:
a first transmitting frame portion; and
a plurality of first transmitting protruding portions protruding from the first transmitting frame portion and being provided between the first receiving protruding portions, and
wherein the second transmitting sensor comprises:
a second transmitting frame portion; and
a plurality of second transmitting protruding portions protruding from the second transmitting frame portion and being provided between the second receiving protruding portions,
wherein the input-sensing device includes a sensing region in which the plurality of receiving electrodes and the plurality of transmitting electrodes are provided and a non-sensing region adjacent to the sensing region,
wherein the first receiving sensor is provided closer to a border between the sensing region and the non-sensing region than the second receiving sensor,
wherein a length of a first border line between the first receiving sensor and the first transmitting sensor shorter than a length of a second border line between the second receiving sensor and the second transmitting sensor,
wherein the first border line is defined by the plurality of first receiving protruding portions and the plurality of first transmitting protruding portions, which engage with each other, and
wherein the second border line is defined by the plurality of second receiving protruding portions and the plurality of second transmitting protruding portions, which engage with each other.

16. The display module of claim 15, wherein the input-sensing device further comprises a plurality of receiving signal lines connected to the plurality of receiving electrodes and a plurality of transmitting signal lines connected to the plurality of transmitting electrodes, and
wherein the plurality of receiving signal lines and the plurality of transmitting signal lines are provided in the non-sensing region.

17. The display module of claim 16, wherein the first receiving sensor is provided adjacent to the border between the sensing region and the non-sensing region, and
at least one of the plurality of receiving signal lines is connected to the first receiving sensor.

18. The display module of claim 17, wherein each of the first receiving sensor, the second receiving sensor, the first transmitting sensor, and the second transmitting sensor has a mesh shape, in which a plurality of openings are defined, and
the plurality of light-emitting devices is exposed by the plurality of openings.

19. An input-sensing device, comprising:
a plurality of electrodes extending in a first direction, being arranged in a second direction crossing the first direction, and comprising first sensors, second sensors, and third sensors; and
a plurality of signal lines connected to the plurality of electrodes,
wherein the input-sensing device includes a sensing region in which the plurality of electrodes is provided and a non-sensing region in which the plurality of signal lines is provided,
wherein each of the first sensors comprises:
a first frame portion; and
a plurality of first protruding portions protruding from the first frame portion, wherein each of the first sensors is disposed at a first distance from a border between the sensing region and the non-sensing region and has a first number of protruding portions, wherein each of the second sensors comprises:

a second frame portion; and a plurality of second protruding portions protruding from the second frame portion, wherein each of the second sensors is disposed at a second distance that is greater than the first distance from the border between the sensing region and the non-sensing region and has a second number of protruding portions greater than the first number of protruding portions, and wherein each of the third sensors comprises:

a third frame portion; and a plurality of third protruding portions protruding from the third frame portion, wherein each of the third sensors is disposed at a third distance that is greater than the second distance from the border between the sensing region and the non-sensing region and has a third number of protruding portions greater than the second number of protruding portions, wherein the plurality of signal lines comprises:

a plurality of first signal lines connected to odd-numbered ones of the plurality of electrodes and arranged adjacent to a first side of the sensing region; and a plurality of second signal lines connected to even-numbered ones of the plurality of electrodes and arranged adjacent to a second side of the sensing region that is opposite to the first side, and wherein each of the first sensors is connected to a corresponding one of the plurality of signal lines.

20. The input-sensing device of claim 19, wherein the first sensors are provided closer to the border between the sensing region and the non-sensing region than the second sensors and the third sensors, and the third sensors are provided at closer to a center of the sensing region than the first sensors and the second sensors.

\* \* \* \* \*